(12) United States Patent
Alaimo, Jr. et al.

(10) Patent No.: US 10,864,994 B2
(45) Date of Patent: Dec. 15, 2020

(54) LOW THROTTLE RATE COMMAND COMPENSATION VIA FULL AUTHORITY ENGINE TRIM

(71) Applicant: The Boeing Company, Chicago, IL (US)

(72) Inventors: John W. Alaimo, Jr., Lynnwood, WA (US); Ian C. Martindale, Seattle, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 16/023,060

(22) Filed: Jun. 29, 2018

(65) Prior Publication Data

US 2020/0002018 A1 Jan. 2, 2020

(51) Int. Cl.
*B64D 31/08* (2006.01)
*B64D 31/14* (2006.01)
*F02D 29/02* (2006.01)
*F02D 35/00* (2006.01)

(52) U.S. Cl.
CPC ............ *B64D 31/08* (2013.01); *B64D 31/14* (2013.01); *F02D 29/02* (2013.01); *F02D 35/0007* (2013.01); *F02D 2200/501* (2013.01)

(58) Field of Classification Search
CPC ......... B64D 31/08; B64D 31/14; F02D 29/02; F02D 35/0007; F02D 2200/501
USPC .......................................................... 701/3
See application file for complete search history.

(56) References Cited

U.S. PATENT DOCUMENTS

| 4,595,158 | A | * | 6/1986 | Robinson | .................. B64C 9/02 244/99.14 |
| 4,651,954 | A | | 3/1987 | Miller | |
| 5,543,696 | A | * | 8/1996 | Huggett | .................... H02P 6/06 318/590 |
| 6,386,485 | B1 | * | 5/2002 | Sjoquist | ................. B64C 13/50 244/194 |

(Continued)

FOREIGN PATENT DOCUMENTS

EP 0 306 064 3/1989

OTHER PUBLICATIONS

Extended European Search Report prepared by the European Patent Office in application No. 19 18 2625 dated Nov. 15, 2019.

*Primary Examiner* — Krishnan Ramesh
(74) *Attorney, Agent, or Firm* — McDonnell Boehnen Hulbert & Berghoff LLP

(57) ABSTRACT

An example method includes: determining a throttle command for a servomotor configured to control a position of a throttle lever, where the position of the throttle lever indicates a commanded thrust for the first engine of the aircraft; determining a trim command for the first engine to equalize the thrust of the first engine with the respective thrust of the second engine; determining that a magnitude of the throttle command is less than a magnitude of a threshold throttle command indicative of a dead zone of the servomotor, where the servomotor is irresponsive to a given throttle command within the dead zone; modifying the trim command based on the throttle command to generate a modified trim command that compensates for irresponsiveness of the servomotor to the throttle command; and changing the thrust generated by the first engine based on the modified trim command.

20 Claims, 14 Drawing Sheets

(56) References Cited

U.S. PATENT DOCUMENTS

| | | | |
|---|---|---|---|
| 7,949,440 B2* | 5/2011 | Ramos | F02C 9/44 |
| | | | 701/14 |
| 2004/0111191 A1* | 6/2004 | Muller | B64D 31/08 |
| | | | 701/3 |
| 2009/0326745 A1* | 12/2009 | Ramos | F02C 9/44 |
| | | | 701/14 |
| 2010/0125378 A1 | 5/2010 | Blechen | |
| 2018/0362176 A1* | 12/2018 | Hirvonen | B64D 31/08 |
| 2019/0382121 A1* | 12/2019 | Schwarz | B64D 47/00 |

* cited by examiner

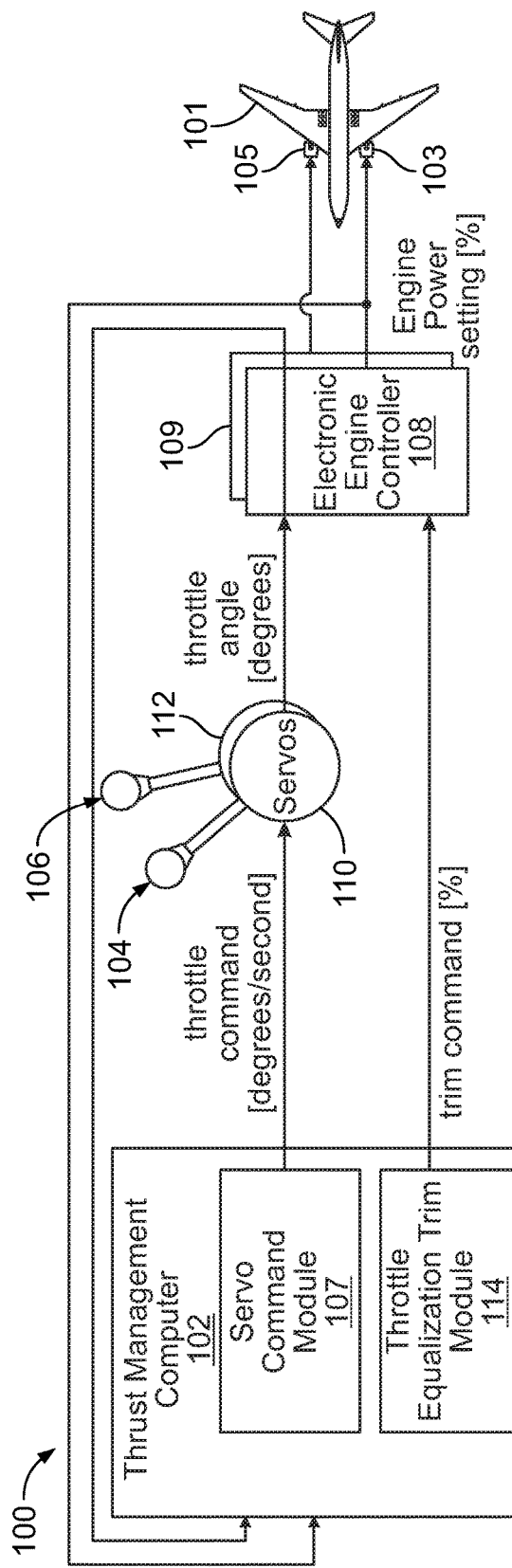
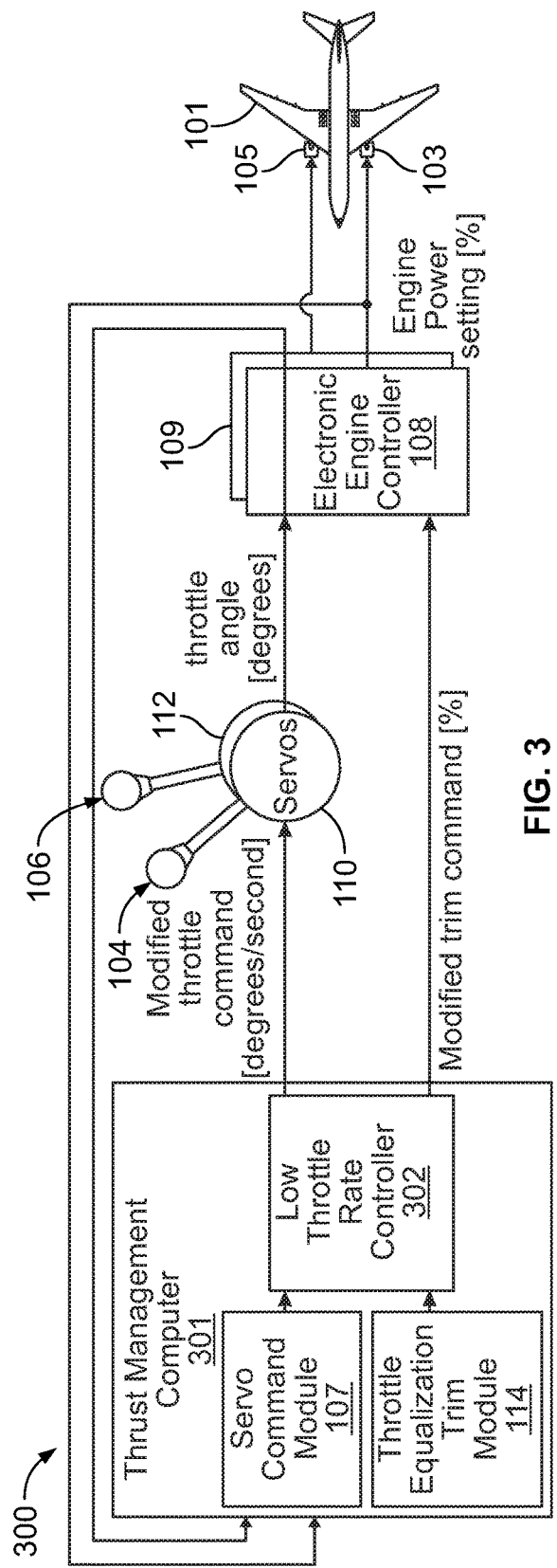

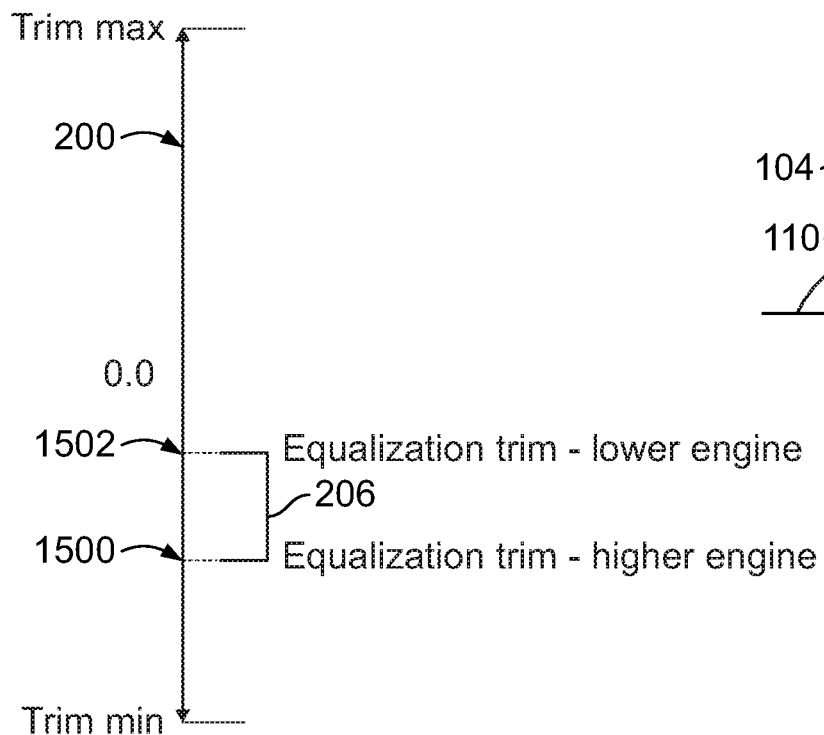
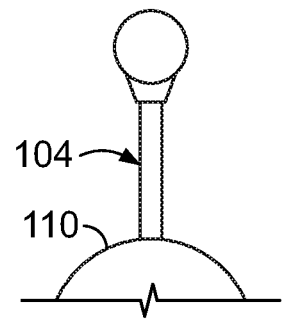
FIG. 15
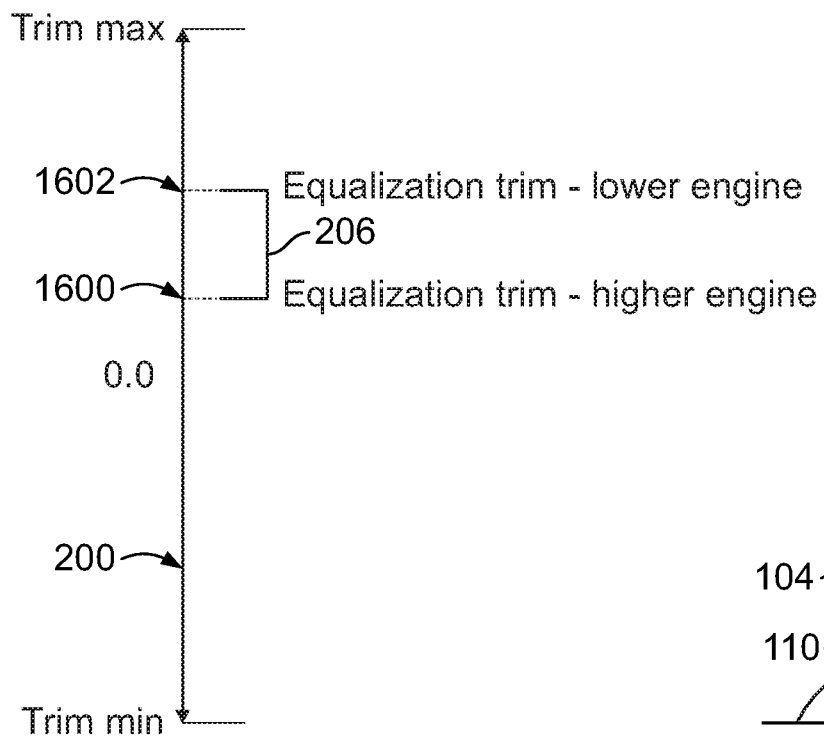
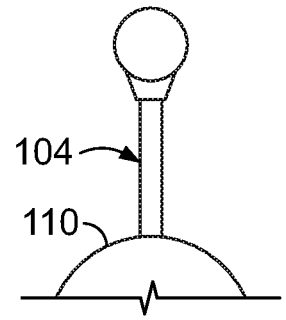
FIG. 16

LOW THROTTLE RATE COMMAND COMPENSATION VIA FULL AUTHORITY ENGINE TRIM

FIELD

The present disclosure relates generally to airplane thrust management. More particularly the present disclosure relates to using full authority engine trim operation to compensate for low throttle rate commands.

BACKGROUND

Autothrottle (automatic throttle) of an aircraft is a system that allows a pilot to control the power setting of aircraft's engines by specifying a desired flight characteristic, rather than manually controlling the fuel flow. Autothrottle can conserve fuel and extend engine life by metering the precise amount of fuel that achieves a specific target indicated air speed or respective assigned power levels for different phases of flight. Autothrottle and automatic flight director systems of the aircraft can work together to fulfill a flight plan and reduce the pilot's work load.

In examples, there can be two parameters that an autothrottle can maintain, or try to attain: speed and engine thrust. In speed control mode, the throttle is positioned to attain a set target speed for the aircraft. This mode controls the speed within safe operating margins. For example, if the pilot selects a target speed which is slower than stall speed, or a speed faster than maximum speed, the autothrottle will maintain a speed closest to the target speed that is within the range of safe speeds.

In thrust control mode, the engine is maintained at a fixed power setting according to the different flight phases. For example, during takeoff, autothrottle can maintain constant takeoff power until takeoff mode is finished. During climb, autothrottle can maintain constant climb power. During descent, autothrottle can retard the throttle to idle position, and so on. When autothrottle is operating in thrust control mode, speed is controlled by pitch angle of the aircraft, and not maintained by autothrottle.

During flight, small adjustments can be made in thrust or speed of the aircraft to achieve passenger comfort or to respond to temporary environmental changes that can occur during flight. For example, environmental changes can occur at high-altitude cruise flight phase, and in response to such environmental changes, autothrottle can apply slow changes to the throttle to maintain speed of the aircraft or engine thrust.

It may thus be desirable to have an autothrottle system that is responsive to slow and small variations in thrust or speed commands. It is with respect to these and other considerations that the disclosure made herein is presented.

SUMMARY

The present disclosure describes examples that relate to low throttle rate command compensation via full authority engine trim.

In one aspect, the present disclosure describes a method. The method includes: (i) determining, by a thrust management computer of an aircraft having at least a first engine and a second engine, a throttle command for a servomotor configured to control a position of a throttle lever, where the position of the throttle lever indicates a commanded thrust for the first engine of the aircraft; (ii) determining, by the thrust management computer based on detecting a difference between a thrust generated by the first engine and a respective thrust generated by the second engine, a trim command for the first engine to equalize the thrust of the first engine with the respective thrust of the second engine; (iii) determining, by the thrust management computer, that a magnitude of the throttle command is less than a magnitude of a threshold throttle command indicative of a dead zone of the servomotor, where the servomotor is irresponsive to a given throttle command within the dead zone; (iv) modifying, by the thrust management computer, the trim command based on the throttle command to generate a modified trim command that compensates for irresponsiveness of the servomotor to the throttle command; and (v) changing, by the thrust management computer, the thrust generated by the first engine based on the modified trim command.

In another aspect, the present disclosure describes a non-transitory computer readable medium having stored therein instructions that, in response to execution by a thrust management computer of an aircraft having at least a first engine and a second engine, cause the thrust management computer to perform operations. The operations include: (i) determining a throttle command for a servomotor configured to control a position of a throttle lever, where the position of the throttle lever indicates a commanded thrust for the first engine of the aircraft; (ii) determining, based on detecting a difference between a thrust generated by the first engine and a respective thrust generated by the second engine, a trim command for the first engine to equalize the thrust of the first engine with the respective thrust of the second engine; (iii) determining that a magnitude of the throttle command is less than a magnitude of a threshold throttle command indicative of a dead zone of the servomotor, where the servomotor is irresponsive to a given throttle command within the dead zone; (iv) modifying the trim command based on the throttle command to generate a modified trim command that compensates for irresponsiveness of the servomotor to the throttle command; and (v) changing the thrust generated by the first engine based on the modified trim command.

In still another aspect, the present disclosure describes a thrust management computer including one or more processors; and data storage storing thereon instructions, that when executed by the one or more processors, cause the thrust management computer to perform operations. The operations include: (i) determining a throttle command for a servomotor configured to control a position of a throttle lever, where the position of the throttle lever indicates a commanded thrust for the first engine of the aircraft; (ii) determining, based on detecting a difference between a thrust generated by the first engine and a respective thrust generated by the second engine, a trim command for the first engine to equalize the thrust of the first engine with the respective thrust of the second engine; (iii) determining that a magnitude of the throttle command is less than a magnitude of a threshold throttle command indicative of a dead zone of the servomotor, where the servomotor is irresponsive to a given throttle command within the dead zone; (iv) modifying the trim command based on the throttle command to generate a modified trim command that compensates for irresponsiveness of the servomotor to the throttle command; and (v) changing the thrust generated by the first engine based on the modified trim command.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 1 illustrates an engine control system for an aircraft having at least a first engine and a second engine, in accordance with an example implementation.

FIG. 3 illustrates an engine control system configured to compensate for dead zones of servomotors, in accordance with an example implementation.

FIG. 15 illustrates effect of a low throttle rate controller on trim commands provided to an electronic engine controller in a scenario where the aircraft is subjected to environmental changes during cruise flight phase, thereby causing the aircraft to speed up, in accordance with an example implementation.

FIG. 16 illustrates effect of a low throttle rate controller on trim commands provided to an electronic engine controller in a scenario where the aircraft is subjected to environmental changes during cruise flight phase, thereby causing the aircraft to slow down, in accordance with an example implementation.

DETAILED DESCRIPTION

Figure 2:
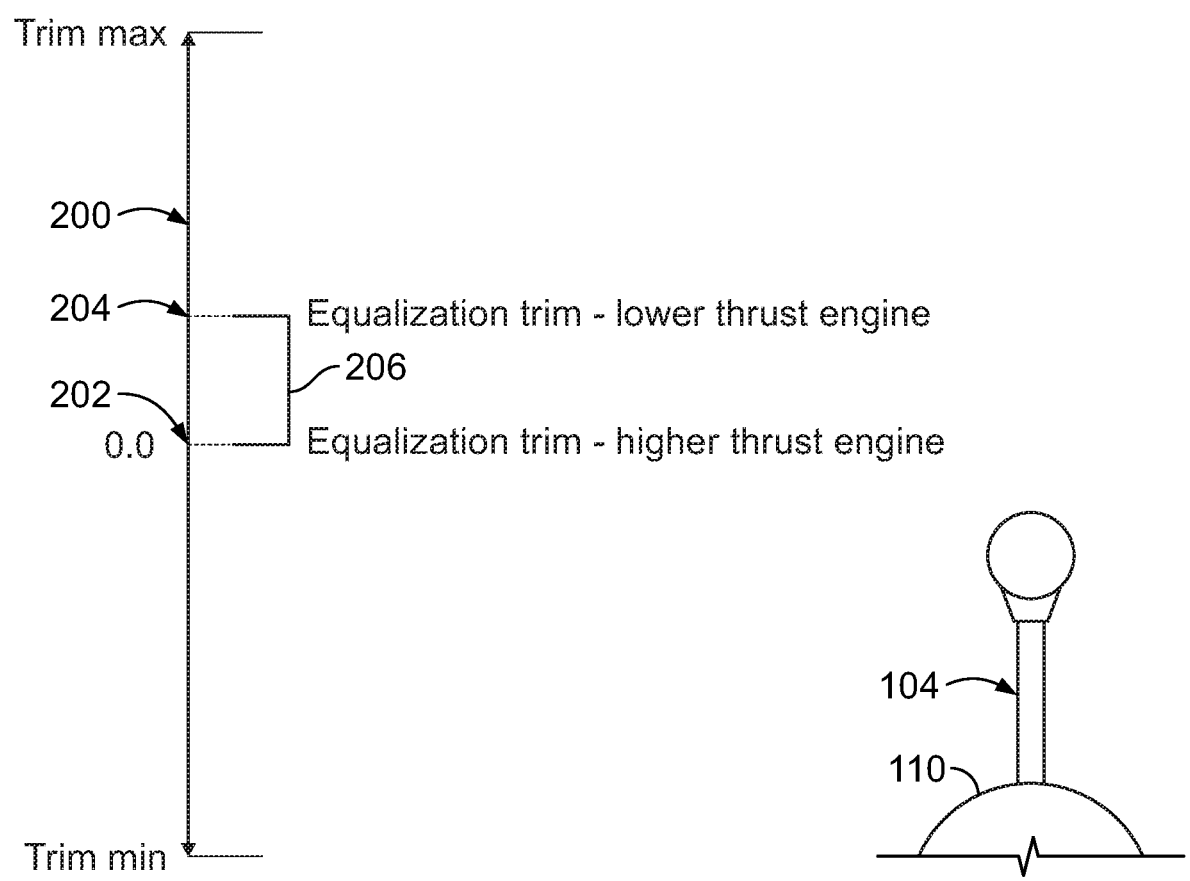
FIG. 2 illustrates application of a trim command by a throttle equalization trim module, in accordance with an example implementation.

Throttle levers can be found in the cockpit of an aircraft, and are used by the pilot, copilot, or autothrottle system to control the thrust or speed output of the aircraft's engines. In multi-engine aircraft, each throttle lever can display the engine number of the engine it controls. Typically, there is one throttle lever for each engine. The throttle levers are typically found in the aircraft's center console, or on the dashboard of smaller aircraft. The position of each lever can be described by a lever angle. The angle can be referred to as the Throttle Lever Angle or TLA. Changes in the TLA can cause corresponding changes in engine thrust or speed. For example, the greater the TLA, the greater the engine thrust or speed. It may be desirable to have an engine control system that can respond to slow and small commands to change the TLA of a throttle lever so as to enable the aircraft to respond to environmental changes or to maintain a particular flight profile.

FIG. 1 illustrates an engine control system 100 for an aircraft 101 having at least a first engine 103 and a second engine 105, in accordance with an example implementation. Components of the engine control system 100 may be configured to work in an interconnected fashion with each other and/or with other components coupled to respective systems. One or more of the described operations or components of the engine control system 100 may be divided up into additional operational or physical components, or combined into fewer operational or physical components. In some further examples, additional operational and/or physical components may be added to the examples illustrated by FIG. 1. Still further, any of the components or modules of the engine control system 100 may include or be provided in the form of a processor (e.g., a microprocessor, a digital signal processor, etc.) configured to execute program code including one or more instructions for implementing logical operations described herein. The engine control system 100 may further include any type of computer readable medium (non-transitory medium) or memory, for example, such as a storage device including a disk or hard drive, to store the program code that when executed by one or more processors cause the engine control system 100 to perform the operations described above. In an example, the engine control system 100 may be included within other systems.

The engine control system 100 includes a thrust management computer 102, one or more throttle levers, such as throttle levers 104, 106, an electronic engine controller (EEC) 108 for the first engine 103, and an EEC 109 for the second engine 105. In the description provided herein, the aircraft 101 is assumed to be a multi-engine aircraft having the first engine 103 and the second engine 105, the first engine 103 being controlled by the throttle lever 104 and the second engine 105 being controlled by the throttle lever 106. This configuration is an example for illustration only, and the description is applicable to aircraft having more engines (e.g., 4-8 engines).

The thrust management computer 102 is configured to control throttle operations of the aircraft 101 to control engine thrust or speed of the engines 103, 105. The term "engine speed" is used herein to indicate rotational speed of a fan of a turbofan jet engine, for example. The thrust management computer 102 of the aircraft 101 can include computing devices, processors, data storage, memories, etc., and can be in communication with various systems and subsystems of the aircraft 101. For instance, the thrust management computer 102 can be in communication with various sensors, navigation module, trajectory management module, communication devices, guidance module, etc. of the aircraft 101. The thrust management computer 102 can be configured to issue commands that indicate a requested thrust or speed for the engines 103, 105 of the aircraft 101 to accomplish particular flight objectives.

In examples, control laws programmed into the thrust management computer 102 are configured to achieve passenger comfort by minimizing throttle operations caused by temporary environmental changes. Environmental changes can occur, for example, in high-altitude cruise flight phase where slow changes in the throttle operation are applicable to control the aircraft speed, or engine thrust or speed.

As such, the thrust management computer 102 can include a servo command module 107 configured to issue throttle commands for the throttle levers 104, 106 that correspond to respective engines thrust or speed. For example, a pilot or autopilot can set a particular commanded cruise speed or climb thrust, and the servo command module 107 determines the throttle command that would achieve an engine thrust or speed to achieve the particular commanded cruise speed or climb thrust. During flight, the servo command module 107 can then modify the throttle command to adjust engine power to correct for any change in environmental conditions of the aircraft 101.

In an example, the engine control system 100 can include a servomechanism or servomotor 110 coupled to and configured to control position of the throttle lever 104. The engine control system 100 can also include a servomotor 112 coupled to and configured to control position of the throttle lever 106. Each servomotor 110, 112 can include an electric motor, for example, and is configured to use error-sensing negative closed-loop feedback to correct the action of the electric motor to control position of a corresponding throttle lever 104, 106.

In particular, the servo command module 107 of the thrust management computer 102 issues throttle commands as a respective throttle lever angular position rate of change, i.e., throttle lever angular speed command, in degrees per second to each of the servomotors 110, 112. In response, the servomotors 110, 112 move the throttle levers 104, 106 at the particular commanded angular speeds provided by the servo command module 107. The servomotors 110, 112 can have rotary position sensors therein configured to measure throttle lever angles (TLAs) of the corresponding throttle levers 104, 106. The rotary position sensors then provide the sensor information indicative of the measured TLAs to the EEC 108 and the EEC 109. Particularly, the EEC 108 receives TLA of the servomotor 110 and the EEC 109 receives TLA of the servomotor 112.

Each of the EECs 108, 109 can also be referred to as an engine control unit (ECU) and can include a computing device, processors, data storage, memories, etc., and can be in communication with various systems and subsystems of the aircraft. The EECs 108, 109 are configured to receive multiple input variables associated with the current flight condition including air density, TLA of the throttle levers 104, 106, engine temperatures, and engine pressures. The input variables are received by the EECs 108, 109 and analyzed continually (e.g., up to 70 times per second). Based on the input variables, the EECs 108, 108 determine respective engine power settings such as engine speed (e.g., fan speed of a turbo fan engine) or engine pressure ratio (EPR), which is the total pressure ratio across a jet engine, measured as the ratio of the total pressure at the exit of the propelling nozzle divided by the total pressure at the entry to the compressor.

Both EPR and engine speed are indicators of engine thrust, and thus one way to generate a particular commanded engine thrust is to set a corresponding engine power setting such as engine speed or EPR. The engine power setting can be determined as a percentage of a maximum engine power setting. For instance, the engine power setting can be determined as a percentage of maximum engine fan speed. The EECs 108, 109 further determine respective engine operating parameters (such as fuel flow, stator vane position, air bleed valve position) that, when applied to the engine 103, 105, achieve the determined or commanded engine power setting for each engine.

Typically, engine power settings for both engines 103, 105 of the aircraft 101 are the same. However, in some examples, the thrust generated by the first engine 103 might be slightly different from or mismatched with the thrust generated by the second engine 105.

Such mismatch can, for example, be caused by minor differences in rotary positions sensors of the servomotors 110, 112. For instance, although each of the servomotors 110, 112 can receive the same throttle command rate from the servo command module 107, the rotary position sensors of the servomotors 110, 112 can provide sensor information indicating that the positions of the servomotor 110 is slightly different from the servomotor 112. Such difference can be caused by manufacturing tolerances of the parts of the servomotors 110, 112, for example. As a result, respective throttle angles detected by the EECs 108, 109 for the throttle levers 104, 106 can be different, thereby causing a difference in the thrust generated by the respective engines 103, 105.

In another example, the first engine 103 of the aircraft 101 may be subjected to environmental conditions that are different from those of the second engine 105, and as a result the thrust generated by the first engine 103 can be different from a respective thrust generated by the second engine 105. Regardless of the cause of a difference in thrust generated by the engines 103, 105 of the aircraft 101, it may be desirable to equalize the thrust generated by the engines 103, 105 to "trim" out any differential thrust between the engines 103, 105.

As such, the thrust management computer 102 includes a throttle equalization trim module 114 configured to provide a trim command to the EEC 108 (or the EEC 109) so as to equalize thrusts generated by the engines 103, 105. Particularly, the throttle equalization trim module 114 can receive the engine power setting generated by the EEC 108 and the EEC 109 and detect a difference between the respective engine power settings. In response, the throttle equalization trim module 114 can generate a trim command to the EEC 108 or the EEC 109 to equalize the thrusts generated by the engines 103, 105.

FIG. 2 illustrates application of a trim command by the throttle equalization trim module 114, in accordance with an example implementation. FIG. 2 illustrates position of the throttle lever 104 on the right and illustrates a vertical axis 200 on the left showing magnitude of trim command applied to the engines.

To illustrate FIG. 2, the second engine 105 is assumed to be a higher thrust engine, where the throttle command to the EEC 109 causes the second engine 105 to generate a higher thrust relative to the first engine 103. The first engine 103 can be referred to as the lower thrust engine. As such, it is assumed that the throttle lever 104 controls the throttle command to the lower thrust engine (i.e., the first engine 103), whereas the throttle lever 104 controls the throttle command to the higher thrust engine (i.e., the second engine 105)

As depicted in FIG. 2, a trim command 202 generated by the throttle equalization trim module 114 to the higher thrust engine is substantially zero, whereas a trim command 204 generated by the throttle equalization trim module 114 to the lower thrust engine is a positive value (e.g., 0.8% additional engine power setting). The difference between the trim command 204 and the trim command 202 is illustrated by a band 206. Thus, even though the throttle lever 104 is vertical or unactuated from its central position, the throttle equalization trim module 114 can generate an additional throttle command to the lower thrust engine to equalize the thrusts generated by both engines 103, 105.

As depicted in FIG. 2, there is a maximum allowable trim command referred to as "trim max" and a minimum allowable trim command referred to as "trim min." The range between "trim max" and "trim min" can be referred to as the "full authority" of engine trim and defines limits that a magnitude of the trim command cannot exceed. Further, the "trim max" and "trim min" values can vary based on an altitude of the aircraft 101. As an example for illustration, "trim max" can be set as 2.5% and "trim min" can be set as −2.5% when the aircraft 101 is at lower altitudes (e.g., less than 10,000 foot). At higher altitudes (e.g., between 25,000 and 40,000 foot) "trim max" can be set as 4.5% and "trim min" can be set as −4.5%, for example. These values are examples for illustration only, and other values can be used. Further, in other examples such as during deceleration of the aircraft 101, rather than increasing thrust command via the trim command 204, both or one of the trim commands 202, 204 can be a negative value to decrease thrust of one engine more than the other engine and equalize thrusts generated by both engines 103, 105.

Referring back to FIG. 1, during flight, the thrust management computer 102 is configured to make small adjustments to the positions of the throttle levers 104, 106 to make corresponding engine power setting adjustments that in turn result in small variations in respective engine thrusts. The small adjustments can be determined by the thrust management computer 102 based on measured airspeed (e.g., the speed of the aircraft relative to the air) coupled with inertial acceleration of the aircraft 101, altitude, the segment of flight, aircraft drag, and engine performance data captured by engine sensors.

The thrust management computer 102 determines and makes the small adjustments to accommodate aircraft movement and configuration changes as well as environmental changes. The small adjustments control the acceleration and deceleration of the aircraft 101 to smoothly change to a new airspeed selection or new flight characteristic, for example.

In some examples, however, the small adjustments to throttle commands provided by the thrust management computer 102 to the servomotors 110, 112 to adjust positions of the throttle levers 104, 106 might not be sufficiently large to allow the servomotors 110, 112 to respond thereto and move the throttle levers 104, 106. Particularly, the servomotors 110, 112 can have deadbands or dead zones that render the servomotors 110, 112 irresponsive to throttle commands less than a particular threshold throttle command. As an example for illustration, the particular threshold throttle command can be about ±0.15 degrees/second. In this example, for a magnitude of a throttle command that is less than a magnitude of the threshold throttle command 0.15 degrees/second (e.g., 0.05 degrees/second), the corresponding servomotor 110 or 112 might not move despite receiving the throttle command from the thrust management computer 102. As a result, the throttle lever 104 or 106 might not move and no corresponding adjustments are made to the engine thrusts.

Such dead zones in the servomotors 110, 112 can thus reduce performance of the aircraft 101 by reducing the ability to make small adjustments to the throttle commands and might lead to jerky increases in thrust adjustments (e.g., when the throttle commands abruptly cross the 0.15 degrees/second threshold). To alleviate the effect of dead zones in the servomotors 110, 112 disclosed herein is an engine control system that detects when the throttle commands are less than the threshold throttle command and make adjustments to the trim command to cause the EECs 108, 109 to respond to the throttle commands to which the servomotors 110, 112 are irresponsive.

FIG. 3 illustrates an engine control system 300 configured to compensate for dead zones of the servomotors 110, 112, in accordance with an example implementation. Identical components used in both engines control systems 100, 300 are designated with the same reference numbers. Components of the engine control system 300 may be configured to work in an interconnected fashion with each other and/or with other components coupled to respective systems. One or more of the described operations or components of the engine control system 300 may be divided up into additional operational or physical components, or combined into fewer operational or physical components. In some further examples, additional operational and/or physical components may be added to the examples illustrated by FIG. 3. Still further, any of the components or modules of the engine control system 300 may include or be provided in the form of a processor (e.g., a microprocessor, a digital signal processor, etc.) configured to execute program code including one or more instructions for implementing logical operations described herein. The engine control system 300 may further include any type of computer readable medium (non-transitory medium) or memory, for example, such as a storage device including a disk or hard drive, to store the program code that when executed by one or more processors cause the engine control system 300 to perform the operations described above. In an example, the engine control system 300 may be included within other systems.

The engine control system 300 includes a thrust management computer 301 that differs from the thrust management computer 102 in that the thrust management computer 301 includes a low throttle rate controller 302. The low throttle rate controller 302 is configured to receive the throttle command generated by the servo command module 107 and trim command generated by the throttle equalization trim module 114 and determines whether to modify one or both of the throttle command and the trim command to compensate for dead zones of the servomotors 110, 112.

As such, rather than the servo command module 107 providing the throttle command directly to the servomotor 110 and the throttle equalization trim module 114 providing the trim command directly to the EEC 108, the low throttle rate controller 302 receives such commands and can modify them before sending a throttle command to the servomotor 110 and a trim command the EEC 108. This way, the low throttle rate controller 302 can detect that a throttle command is less than a threshold throttle command (e.g., less than 0.15 degrees/second) and modify the trim command to compensate for irresponsiveness of the servomotor 110 to such low throttle command. The throttle lever 104, the servomotor 110, and the EEC 108 are used herein as examples to illustrate operations of the engine control system 300; however, the description is applicable to the throttle lever 106, the servomotor 112, and the EEC 109.

Figure 4:
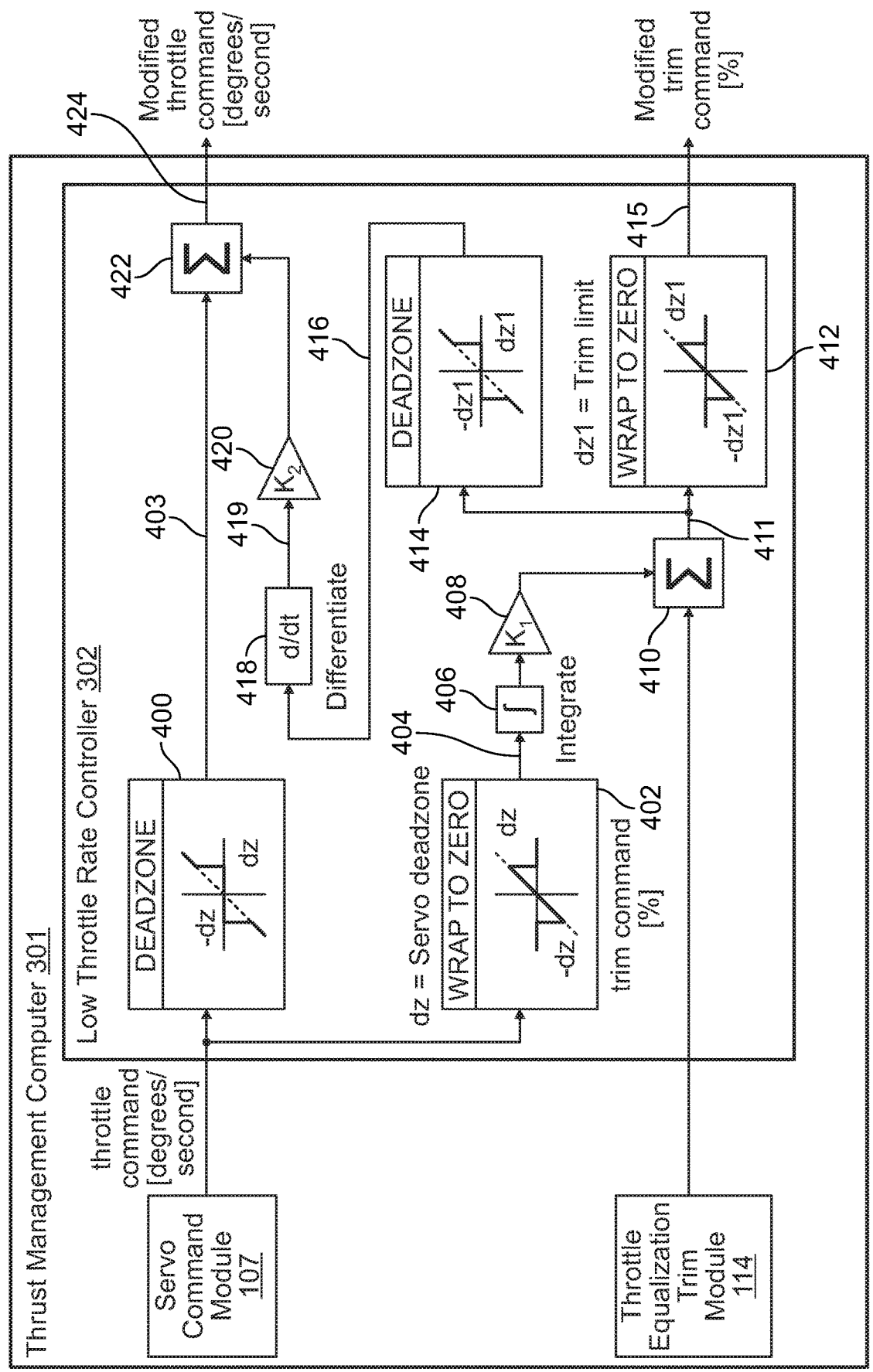
FIG. 4 illustrates operations performed by a low throttle rate controller, in accordance with an example implementation.

FIG. 4 illustrates operations performed by the low throttle rate controller 302, in accordance with an example implementation. As illustrated in FIG. 4, the throttle command generated by the servo command module 107 is provided to the low throttle rate controller 302, and particularly to block 400 and block 402 of the low throttle rate controller 302. At the block 400, the low throttle rate controller 302 determines whether a magnitude of the throttle command in degrees/second is less than a magnitude of a threshold throttle command "dz" (e.g., 0.15 degrees/second). If the magnitude of the throttle command is less than the magnitude of the threshold throttle command "dz," the block 400 outputs a value of zero to line 403. If the magnitude of the throttle command is greater than or equal to the magnitude of the threshold throttle command "dz," the block 400 outputs the throttle command as received to the line 403.

The throttle command is also received at the block 402, which can be referred to as a wrap-to-zero block. The block 402 can perform an operation that is the reverse of the operation performed by the block 400, for example. Particularly, if the magnitude of the throttle command is greater than or equal to the magnitude of the threshold throttle command "dz," the block 402 outputs a value of zero to line 404. If the magnitude of the throttle command is less than the magnitude of the threshold throttle command "dz," the block 402 outputs the throttle command as received to the line 404.

As such, if the magnitude of the throttle command is less than the magnitude of the threshold throttle command and the servomotor 110 is incapable of responding to such throttle command, the throttle command is passed to the line 404. If the magnitude of the throttle command is greater than or equal to the magnitude of the threshold throttle command and the servomotor 110 is capable of responding to such throttle command, the throttle command is passed to the line 403.

Assuming that the magnitude of the throttle command is less than the magnitude of the threshold throttle command, the throttle command is passed to the line 404 and the low throttle rate controller 302 integrates the throttle command over time at block 406. Integrating the throttle command over time amounts to accumulating the throttle command over time. Integrating the throttle command over time also converts a throttle command in degrees/second to an angular position command in degrees for the throttle lever 104.

The angular position command in degrees resulting from the block 406 is then multiplied by a gain $K_1$ at gain block 408 to convert the angular position command for the throttle lever 104 to an engine power setting command. For instance, the gain $K_1$ of the gain block 408 can convert the angular position command to an engine fan speed or an EPR command. The gain $K_1$ of the gain block 408 can also convert the angular position command to an engine power setting command in a format or unit that matches the trim command generated by the throttle equalization trim module 114. For example, if the throttle equalization trim module 114 generates the trim command as an engine power setting percentage command (e.g., a percentage of a maximum value for the engine power setting), then the gain block 408 can convert the angular position command resulting from the block 406 to a power setting percentage command.

The output of the gain block 408 is then summed with the trim command at summation block 410. As such, the throttle command generated by the servo command module 107 in degrees/second is now converted to an engine power setting that offsets or shifts (e.g., adds to or subtracts from) the trim command generated by the throttle equalization trim module 114 to generate a modified trim command at line 411 as an output from the summation block 410.

The modified trim command at the line 411 is then provided to block 412 and block 414. At the block 412, the low throttle rate controller 302 compares the modified trim command to a trim limit value "dz1." The trim limit value "dz1" can be, for example, a magnitude of the "trim max" or "trim min" value, which depends on an altitude of the aircraft 101 (e.g., the trim limit value "dz1" can be 2.5% at low altitudes and 4.5% at high altitudes).

The block 412 can be referred to as a wrap-to-zero block and operates such that if the magnitude of the modified trim command is less than trim limit value "dz1," the block 412 outputs the modified trim command as received to line 415. The modified trim command in the line 415 is then provided to the EEC 108 as shown in FIG. 3. On the other hand, if the magnitude of the modified trim command is greater than or equal to the trim limit value "dz1," the block 412 outputs a value of zero to the line 415.

The modified trim command at the line 411 is also received at the block 414. The block 414 can perform an operation that is the reverse of the operation of the block 412, for example. Particularly, if the magnitude of the modified trim command is less than the trim limit value "dz1," the block 414 outputs a value of zero at line 416. If the magnitude of the modified trim command is greater than or equal to the trim limit value "dz1," the block 414 outputs the modified trim command as received to the line 416.

As such, if the magnitude of the modified trim command at the line 411 is less than the trim limit value, (e.g., less than "trim max"), the modified trim command is passed through to the line 415 and then to the EEC 108. If the magnitude of the modified trim command is greater than or equal to the trim limit value, the modified trim command is passed to the line 416.

If the magnitude of the modified trim command is greater than or equal to the trim limit value and the modified trim command is passed to the line 416, further operations are performed thereon. Particularly, at block 418, the low throttle rate controller 302 differentiates the modified trim command with respect to time. In other words, the low throttle rate controller 302 determines the time derivative of the modified trim command, i.e., determines the rate of change of the modified trim command with respect time. The time derivative output of the block 418 is provided to line 419 and represents the time rate of change of the modified trim command (e.g., in engine power setting percentage per second).

The low throttle rate controller 302 then multiplies the time rate of change of the modified trim command by a gain $K_2$ at gain block 420 to convert the time rate of change of the modified trim command to a throttle command in degrees/seconds. As an example, the gain $K_2$ can be $1/K_1$. As such, the gain $K_2$ converts the modified trim command (e.g., as an engine power setting percentage) to a corresponding throttle lever angular position value in degrees such that the output of the gain block 420 is in degrees/second and matches the units of the value provided at the line 403.

At summation block 422, the low throttle rate controller 302 adds the output of the gain block 420 to the throttle command in degrees/second provided to the line 403 from the block 400. As such, the trim command generated by the throttle equalization trim module 114 as an engine power setting (or percentage thereof) is converted to a throttle command in degrees/second that is added to the throttle command generated by the servo command module 107 to generate a modified throttle command at line 424 as an output from the summation block 422. The modified throttle command is then provided to the servomotor 110.

The configuration of the low throttle rate controller 302 compensates for throttle commands that are within the dead zones of the servomotors 110, 112 and renders the engine control system 300 responsive to such throttle commands. For example, if the magnitude of the throttle command generated by the servo command module 107 is less than the magnitude of the threshold throttle command "dz," the throttle command is passed to the block 402 and is integrated over time at the block 406. A throttle command that is within the dead zone of the servomotor 110, such that the servomotor 110 is irresponsive thereto, can be considered as an error. Integrating such error over time results in accumulating the error over time and modifying the trim command to compensate for the error.

Particularly, the accumulated throttle command or error is converted at the gain block 408 to an engine power setting that is added to the trim command generated by the throttle equalization trim module 114 to offset or modify the trim command. As such, the magnitude of a modified trim command is generated and the modified trim command can be larger than the magnitude of the trim command generated by the throttle equalization trim module 114. This way, the EEC 108 can cause the first engine 103 to generate an increased thrust compared to a thrust that would have been generated without the low throttle rate controller 302. The increase in thrust compensates for irresponsiveness of the servomotor 110 to the magnitude of the throttle command that is less than the magnitude of the threshold throttle command "dz."

On the other hand, if the magnitude of the throttle command is larger than the magnitude of the threshold throttle command, the throttle command is passed to the line 403 and the engine control system 300 may operate similar to the engine control system 100. The servomotor 110 can respond to such throttle command because it exceeds the dead zone of the servomotor 110.

Further, the engine control system 300 can be configured such that the trim limit value "dz1" is greater than the threshold throttle command "dz." With this configuration, if the magnitude of the throttle command is less than the threshold throttle command "dz," but the modified trim command at the line 411 exceeds the trim limit value "dz1," the summation at the summation block 422 of the differentiated and scaled modified trim command and the throttle command exceeds the throttle command threshold "dz." Thus, the magnitude of the modified throttle command provided at the line 424 exceeds the throttle command threshold "dz" and the servomotor 110 is responsive thereto.

It should be noted that the operations performed by the low throttle rate controller 302 shown in FIG. 4 to result the modified throttle command the modified trim command are performed for one of the engines 103, 105, and that the same or similar operations are performed independently for the other engine to generate the modified throttle command the modified trim command thereto.

To illustrate performance of the engine control system 300, FIGS. 5, 6, 7, 8, 9, 10, 11, 12, 13, 14, 15, and 16 illustrate effect of the low throttle rate controller 302 on trim commands provided to the EEC 108 in various scenarios, in accordance with an example implementation. FIGS. 5-16 are similar to FIG. 2 and show position of the throttle lever 104 on the right and illustrate the vertical axis 200 on the left showing trim commands applied to both engines of an aircraft. As mentioned above, it is assumed that the second engine 105 is the higher thrust engine and the first engine 103 is the lower thrust engine. It is also assumed that the throttle lever 104 controls the throttle command to the lower thrust engine (the first engine 103).

Figure 5:
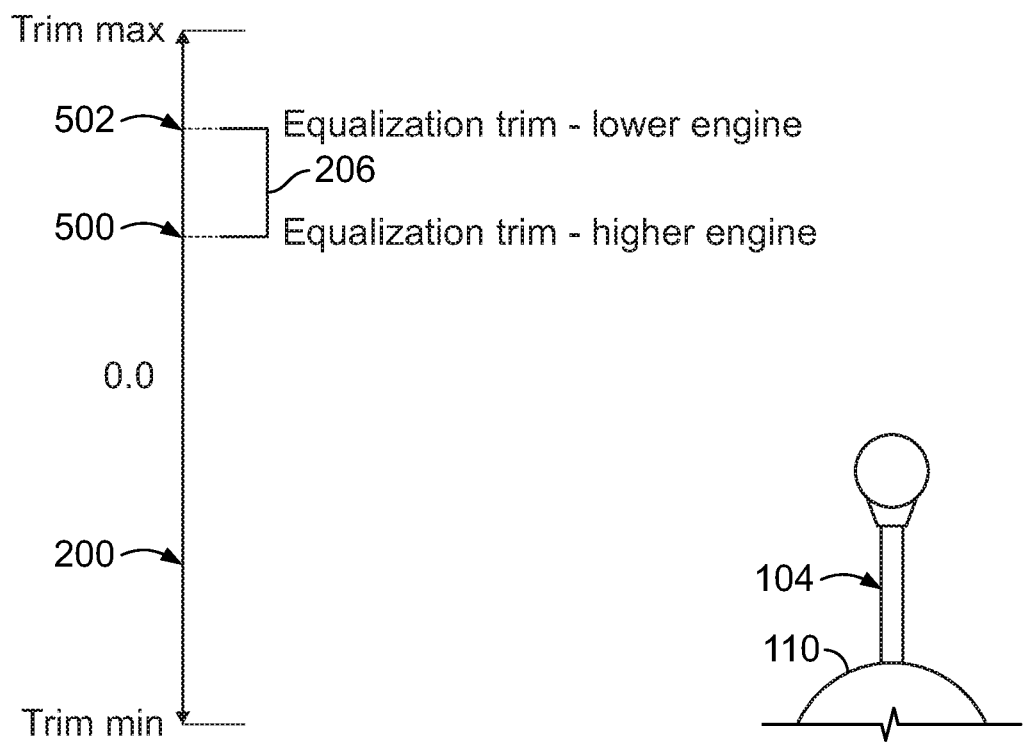
FIG. 5 illustrates effect of a low throttle rate controller on trim commands provided to an electronic engine controller in a scenario where a small acceleration of an aircraft is commanded, in accordance with an example implementation.

FIG. 5 illustrates a scenario where a small acceleration of the aircraft 101 is commanded. In this scenario, the throttle command generated by the servo command module 107 is less than the threshold throttle command. As such, the throttle lever 104 remains unmoved or unactuated from its vertical position. In other words, the angular position of the throttle lever 104 is maintained. However, trim commands generated by the throttle equalization trim module 114 are shifted upward along the vertical axis 200. Particularly, rather than the trim command 202 to the higher thrust engine being zero as illustrated in FIG. 2, a modified trim command 500 to the higher thrust engine has a positive value (e.g., 0.5% additional engine power setting). Also, rather than the trim command 204 to the lower thrust engine having a particular positive value as illustrated in FIG. 2, a modified trim command 502 to the lower thrust engine has a higher value a positive value (e.g., 1.5% compared to 0.8%). As such, a throttle command to which the servomotor 110 could have been irresponsive is compensated for by shifting or increasing the trim commands to higher values to increase engine thrusts. This way, the engine control system 300 compensates for the dead zone of the servomotor 110. As such, the engine controls system 300 enhances operation of the aircraft 101 as it enables making small adjustments to the throttle commands leading to smooth thrust changes, as opposed to leading to jerky increases in thrust adjustments resulting from abruptly crossing the threshold throttle command.

Figure 6:
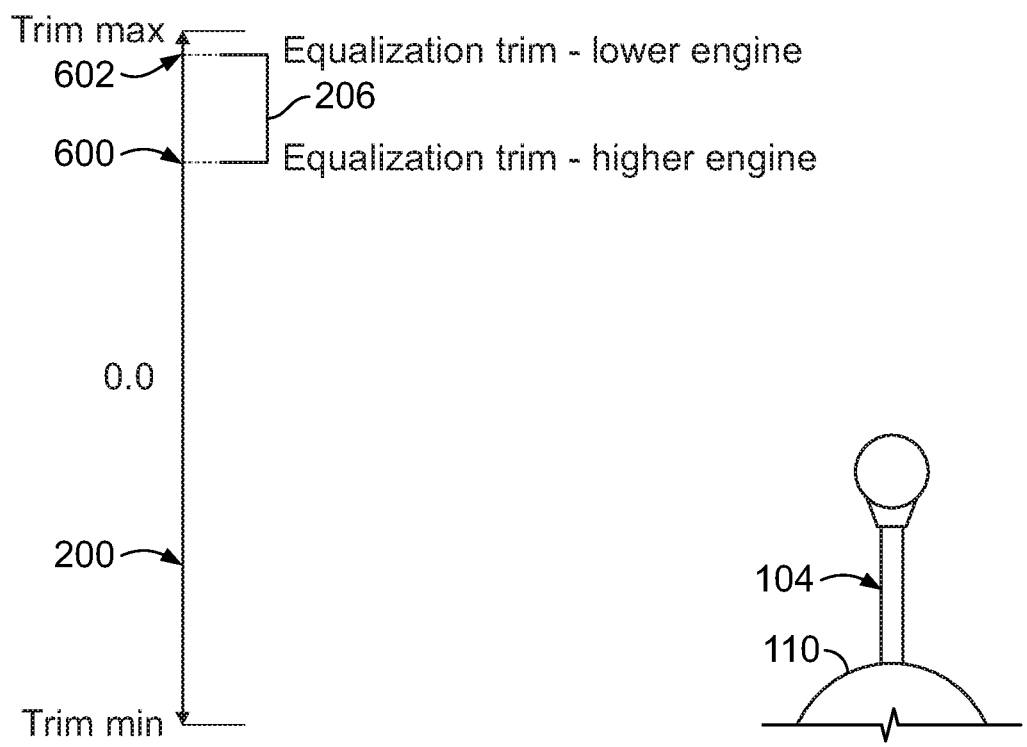
FIG. 6 illustrates effect of a low throttle rate controller on trim commands provided to an electronic engine controller in a scenario where further acceleration of the aircraft is commanded compared to FIG. 5, in accordance with an example implementation.

FIG. 6 illustrates a scenario where further acceleration of the aircraft 101 is commanded compared to FIG. 5. In this scenario, the throttle command generated by the servo command module 107 is, however, less than the threshold throttle command. As shown, the trim commands are shifted further upward along the vertical axis 200 to modified trim command 600 to the higher thrust engine and modified trim command 602 to the lower thrust engine. The modified trim commands 600, 602 do not exceed the trim limit value "trim max" and the throttle lever 104 remains unactuated; however, the engine control system 300 enables the aircraft 101 to respond to throttle commands that are less than the threshold throttle command, thus enabling smooth thrust adjustments.

Figure 7:
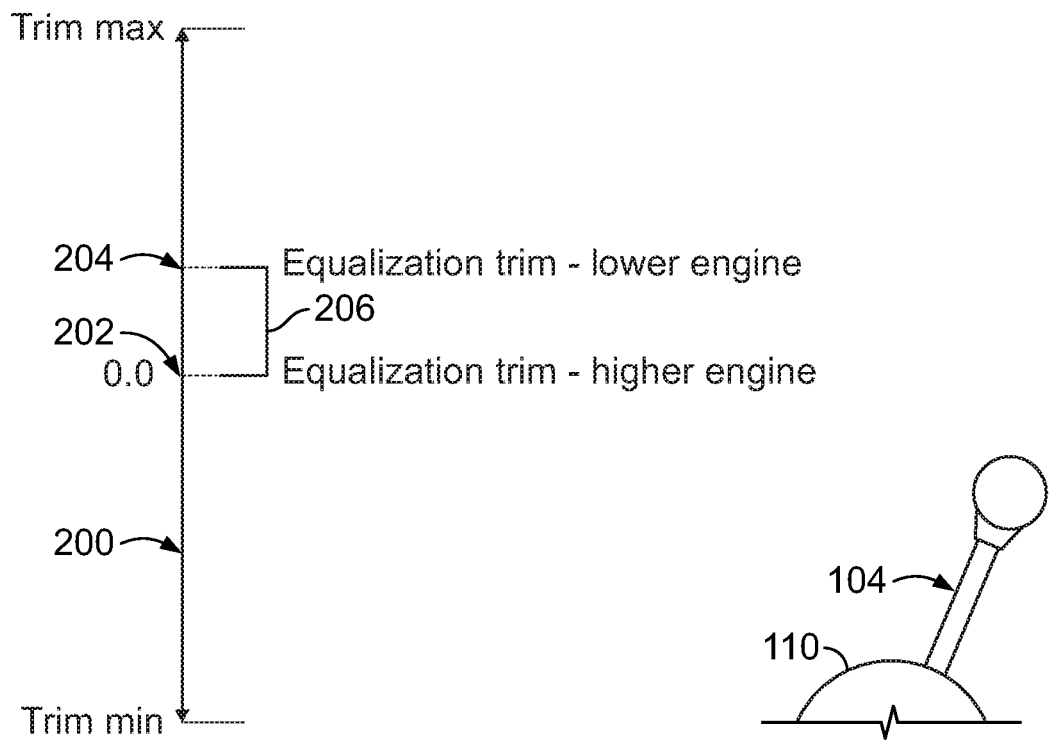
FIG. 7 illustrates effect of a low throttle rate controller on trim commands provided to an electronic engine controller in a scenario where even further acceleration of the aircraft is commanded compared to FIG. 6, in accordance with an example implementation.

FIG. 7 illustrates a scenario where even further acceleration of the aircraft 101 is commanded compared to FIG. 6. In this scenario, if the modified trim commands are shifted more upward compared to FIG. 6, they could exceed the trim limit value "trim max," which might not be allowed. Thus, rather than exceeding the trim limit value (i.e., exceeding the "full authority" available), the trim command is passed through the blocks 414, 418, 420, and 422 shown in FIG. 4 to generate a modified throttle command that is higher than the threshold throttle command. As a result, the servomotor 110 is responsive to the modified throttle command and moves the throttle lever 104 as shown in FIG. 7. In this scenario, the trim commands can revert back to their un-shifted positions, i.e., revert to the trim command 202 (to one of the EECs 108, 109) being substantially zero and the trim command 204 (e.g., to the other EEC of the EECs 108, 109) to the lower thrust engine being less than the trim commands 502, 602.

Figure 8:
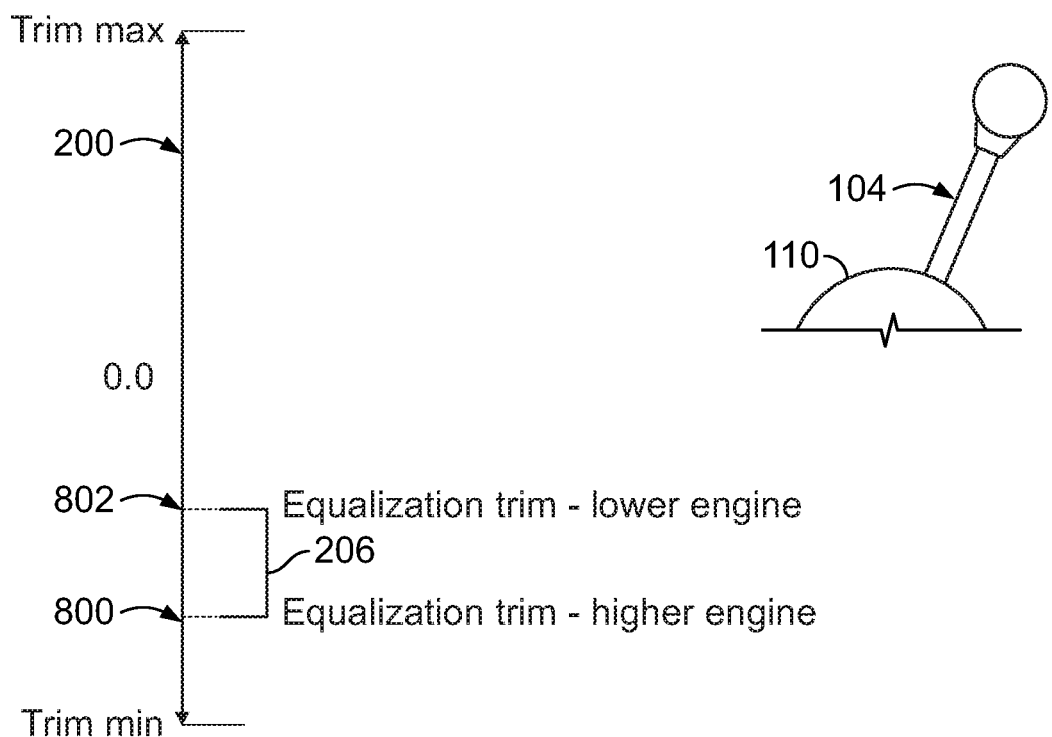
FIG. 8 illustrates effect of a low throttle rate controller on trim commands provided to an electronic engine controller in a scenario where a small deceleration of the aircraft is commanded after operating in the scenario of FIG. 7, in accordance with an example implementation.

FIG. 8 illustrates a scenario where a small deceleration of the aircraft 101 is commanded after operating in the scenario of FIG. 7. In the scenario of FIG. 8, a magnitude of the deceleration throttle command generated by the servo command module 107 is less than the magnitude of the threshold throttle command "dz." As such, the throttle lever 104 remains unmoved compared to its position of FIG. 7. However, trim commands generated by the throttle equalization trim module 114 are shifted downward along the vertical axis 200. Particularly, rather than the trim command 202 to the higher thrust engine being zero as illustrated in FIG. 2, a modified trim command 800 to the higher thrust engine is a negative value (e.g., −1.5% reduction in engine power setting). Also, a modified trim command 802 is provided to the lower thrust engine as a negative value to reduce thrust (e.g., −0.8% reduction in engine power setting) or a corresponding engine and decelerate the aircraft 101. As such, a deceleration throttle command to which the servomotor 110 could have been irresponsive is compensated for by shifting the trim commands to larger negative values to decrease the engines' thrusts. This way, the engine control system 300 compensates for the dead zone of the servomotor 110, and again enables making small adjustments to the throttle commands leading to smooth thrust changes.

Figure 9:
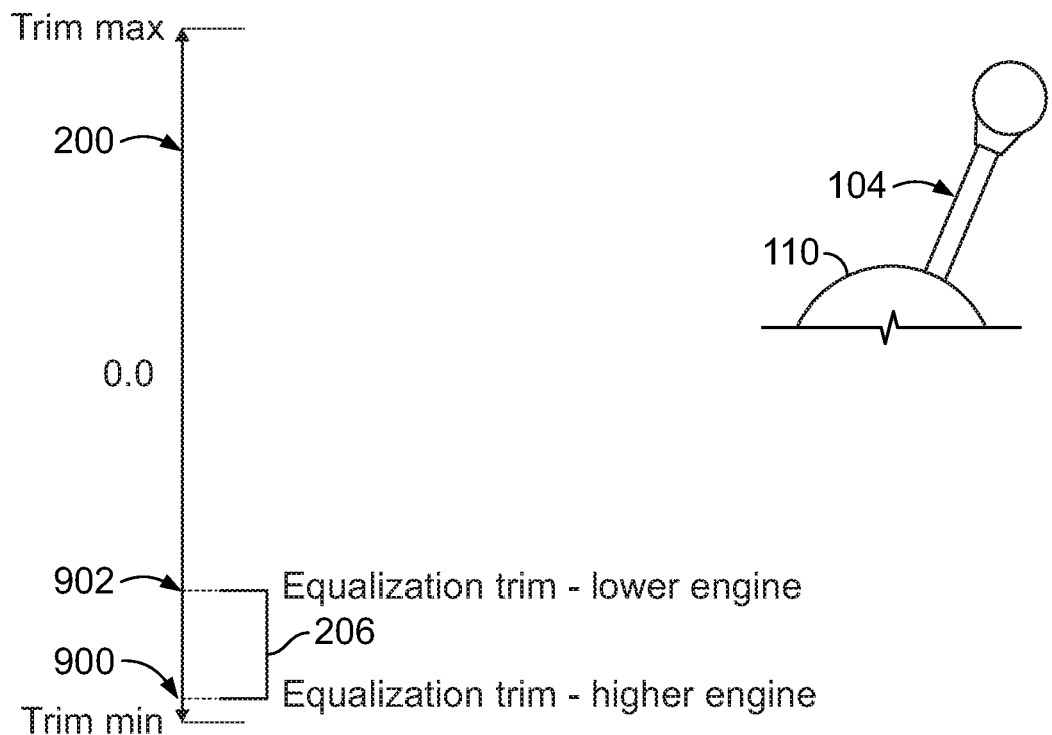
FIG. 9 illustrates effect of a low throttle rate controller on trim commands provided to an electronic engine controller in a scenario where further deceleration of the aircraft is commanded compared to FIG. 8, in accordance with an example implementation.

FIG. 9 illustrates a scenario where further deceleration of the aircraft 101 is commanded compared to FIG. 8. In this scenario, a magnitude of the throttle command generated by the servo command module 107 is, however, still less than the magnitude of the threshold throttle command "dz." As shown, the trim commands are shifted further downward along the vertical axis 200 to modified trim command 900 to the higher thrust engine and modified trim command 902 to the lower thrust engine. Magnitudes of the modified trim commands 900, 902 do not exceed a magnitude of the trim limit value "trim min" and the throttle lever 104 remains in its position of FIG. 8, i.e., the throttle lever 104 is not moved. This way, the trim commands 900, 902 compensate for the dead zone of the servomotor 110; however, the trim commands 900, 902 enable the aircraft 101 to respond to throttle commands that are less than the magnitude of the threshold throttle command, thus enabling smooth thrust adjustments without moving the throttle lever 104.

Figure 10:
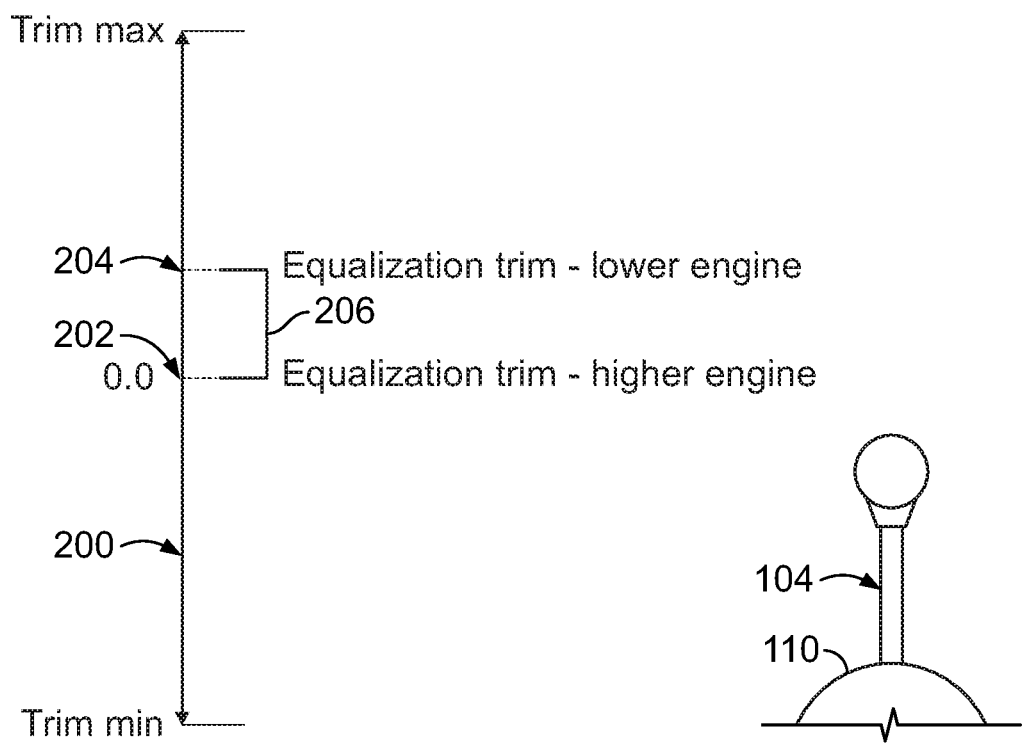
FIG. 10 illustrates effect of a low throttle rate controller on trim commands provided to an electronic engine controller in a scenario where even further deceleration of the aircraft is commanded compared to FIG. 9, in accordance with an example implementation.

FIG. 10 illustrates a scenario where even further deceleration of the aircraft 101 is commanded compared to FIG. 9. In this scenario, if the modified trim commands are shifted more downward compared to FIG. 9, they could exceed the trim limit value "trim min." Thus, rather than exceeding the trim limit value (i.e., exceeding the "full authority" available), the trim command is passed through the blocks 414, 418, 420, and 422 shown in FIG. 4 to generate a modified throttle command having a magnitude that is larger than the magnitude of the threshold throttle command "dz." As a result, the servomotor 110 is responsive to the modified throttle command and moves the throttle lever 104 back as shown in FIG. 10 to reduce engine thrust. In this scenario, the trim commands can revert back to their un-shifted positions, i.e., revert to the trim commands 202, 204.

Figure 11:
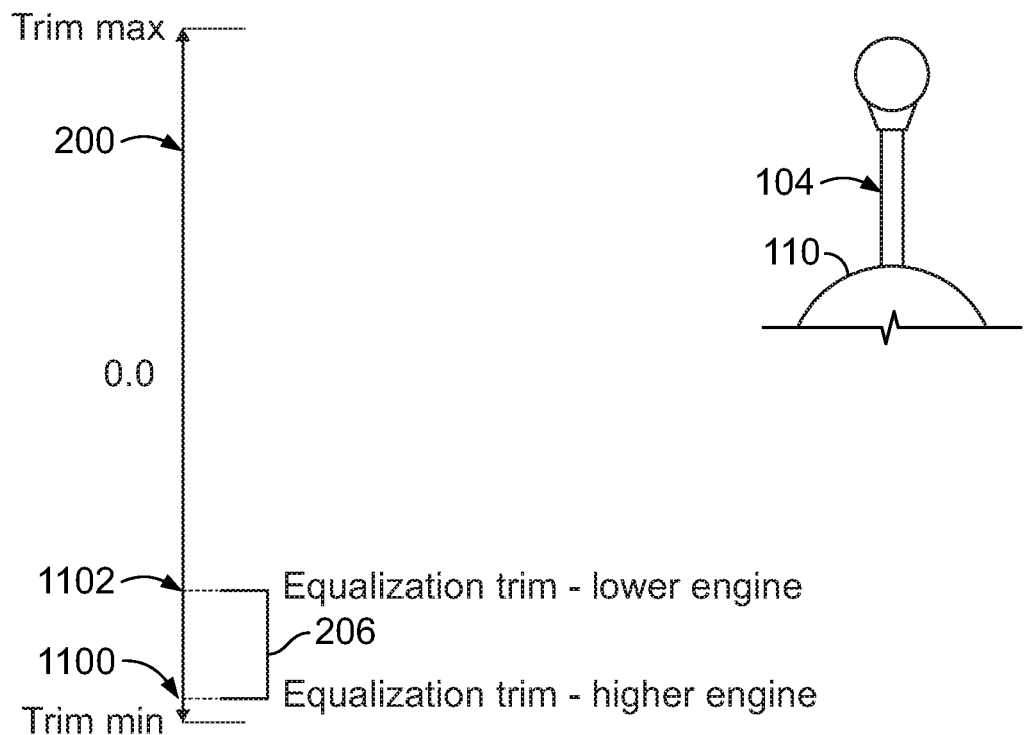
FIG. 11 illustrates effect of a low throttle rate controller on trim commands provided to an electronic engine controller in a scenario where further deceleration of the aircraft is commanded compared to FIG. 10, in accordance with an example implementation.

FIG. 11 illustrates a scenario where further deceleration of the aircraft 101 is commanded compared to FIG. 10. In this scenario, the magnitude of the throttle command generated by the servo command module 107 is less than the magnitude of the threshold throttle command. As a result, the throttle lever 104 remains unactuated compared to FIG. 10, but the trim commands are shifted downward along the vertical axis 200 to modified trim command 1100 to the higher thrust engine and modified trim command 1102 to the lower thrust engine. Magnitudes of the modified trim commands 900, 902 do not exceed a magnitude of the trim limit value "trim min."

Figure 12:
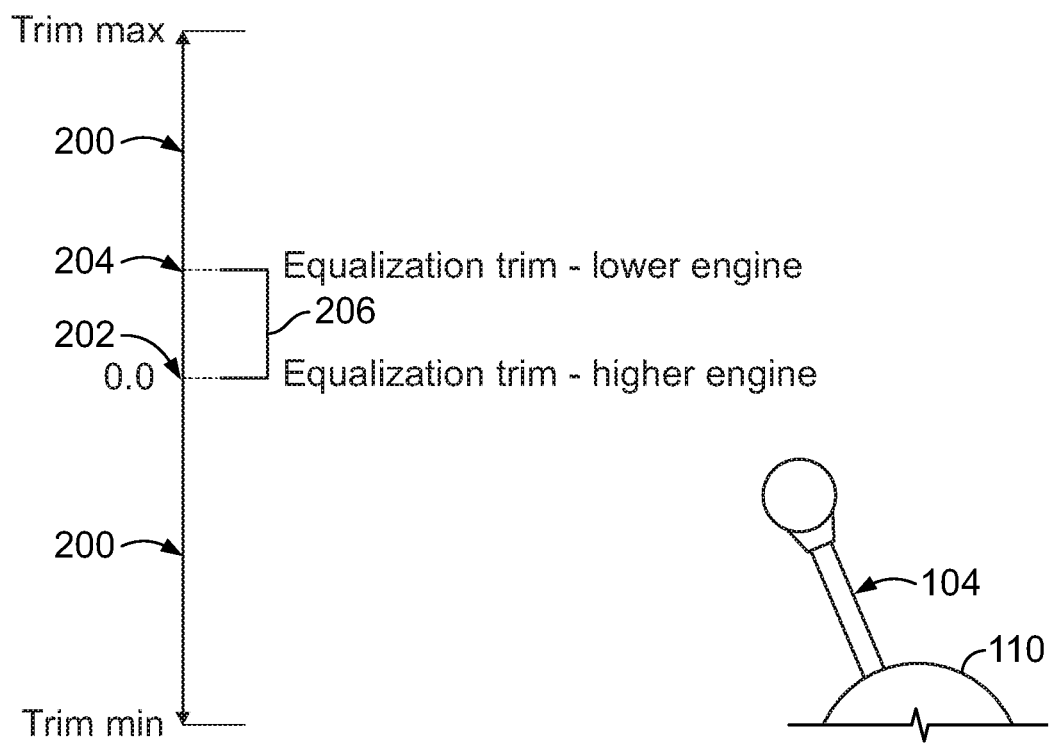
FIG. 12 illustrates effect of a low throttle rate controller on trim commands provided to an electronic engine controller in a scenario where even further deceleration of the aircraft is commanded compared to FIG. 11, in accordance with an example implementation.

FIG. 12 illustrates a scenario where even further deceleration of the aircraft 101 is commanded compared to FIG. 11. If the modified trim commands are shifted more downward compared to FIG. 11, they could exceed the trim limit value "trim min." Thus, rather than exceeding the trim limit value (i.e., exceeding the "full authority" available), the trim command is passed through the blocks 414, 418, 420, and 422 shown in FIG. 4 to generate a modified throttle command having a magnitude that is larger than the magnitude of the threshold throttle command "dz." As a result, the servomotor 110 is responsive to the modified throttle command and moves the throttle lever 104 back as shown in FIG. 12 to reduce engine thrust. In this scenario, the trim commands can revert back to their un-shifted positions, i.e., revert to the trim commands 202, 204.

Figure 13:
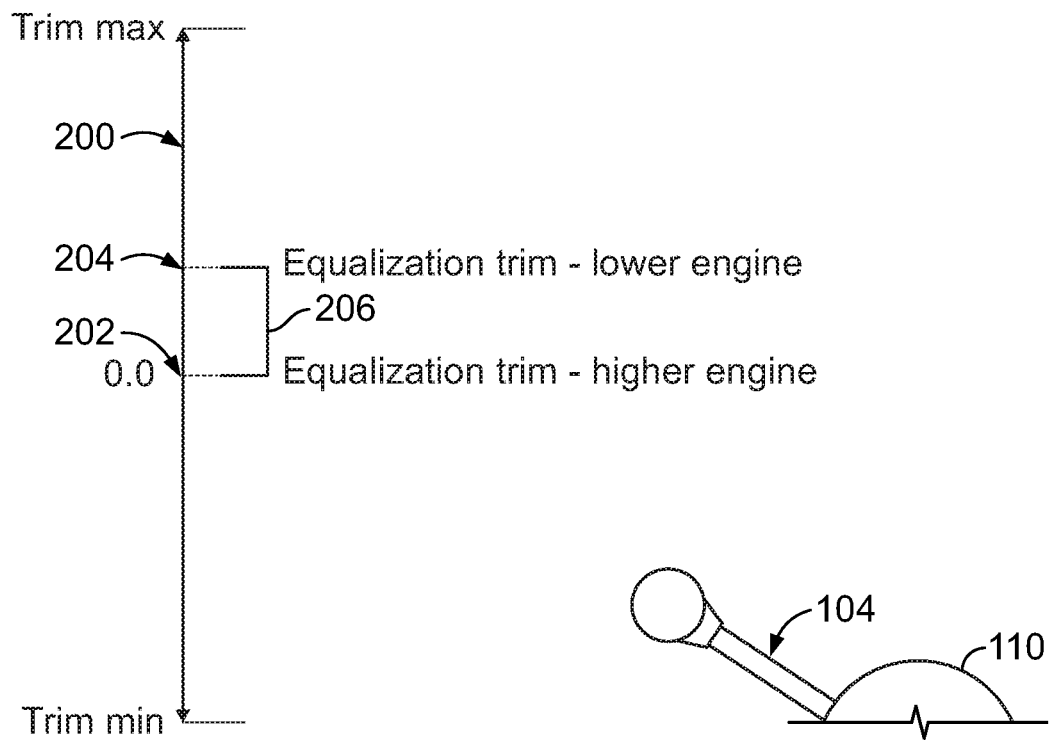
FIG. 13 illustrates effect of a low throttle rate controller on trim commands provided to an electronic engine controller in a scenario where even further deceleration of the aircraft is commanded compared to FIG. 12, in accordance with an example implementation.

FIG. 13 illustrates a scenario where even further deceleration of the aircraft 101 is commanded compared to FIG. 12. In this scenario, a large deceleration throttle command is provided and the servomotor 110 is capable of responding to such command. The throttle lever 104 thus moves further back while the trim commands remain un-shifted.

Figure 14:
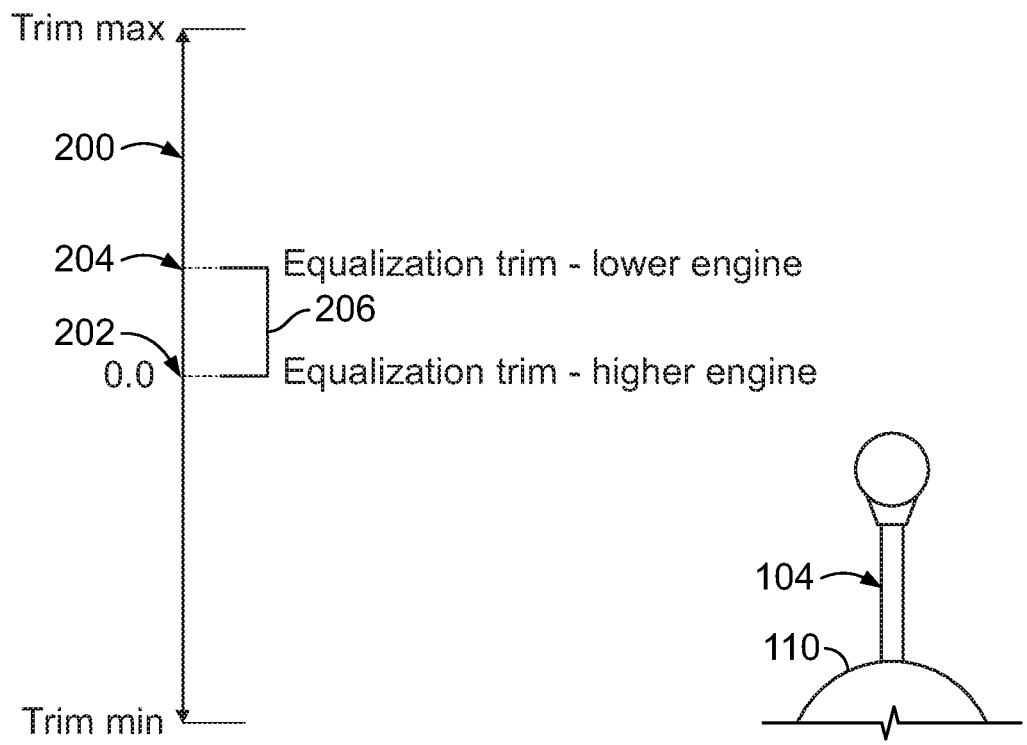
FIG. 14 illustrates effect of a low throttle rate controller on trim commands provided to an electronic engine controller in a scenario where the aircraft is in a cruise flight phase and no engine thrust changes are commanded, in accordance with an example implementation.

FIG. 14 illustrates a scenario where the aircraft 101 is in a cruise flight phase and no engine thrust changes are commanded. As depicted in FIG. 14, the throttle lever 104 is unactuated from its neutral or initial throttle setting and the trim commands are not shifted along the vertical axis 200, i.e., the trim commands provide typical engine thrust equalization commands.

FIGS. 15-16 illustrates scenarios where the aircraft 101 is subjected to environmental changes during the cruise flight phase, thereby causing small speed perturbations. For instance, air pressure changes around the aircraft 101 can cause some speed perturbations. To maintain cruise speed of the aircraft 101 and enhance passenger experience, corresponding small engine thrust changes can be commanded.

In FIG. 15, the speed perturbations have caused the aircraft 101 to speed up, and thus to counteract such perturbations, a small throttle command can be provided by the servo command module 107 to decrease engine thrust. A magnitude of the throttle command can be less than the magnitude of the threshold throttle command "dz," and thus the trim commands are shifted downward to trim command 1500 and trim command 1502 as shown in FIG. 15 while the throttle lever 104 maintains its position (i.e., remains unactuated).

If on the other hand, the speed perturbations have caused the aircraft 101 to slow down, then to counteract such perturbations, a small throttle command can be provided by the servo command module 107 to increase the engine thrust. As depicted in FIG. 16, the magnitude of the throttle command can be less than the magnitude of the threshold throttle command, and thus the trim commands are shifted upward to trim command 1600 and trim command 1602 to increase commanded engine power setting while the throttle lever 104 remains unactuated.

As such, the engine control system 300 enables the aircraft 101 to respond to and compensate for environmental changes that cause perturbations to the aircraft 101 by moving the trim commands up and down the vertical axis 200 representing the available trim command range, rather than by moving the throttle lever 104. It should be understood that the descriptions above with respect to FIGS. 5-16 are also applicable to the servomotor 112, the throttle lever 106, and the EEC 109. Further, in FIG. 5-16 the difference between the trim command to the higher thrust engine and the trim command to the lower thrust engine is illustrated by the band 206 similar to FIG. 2; however, it should be understood that a different band value can be used for the engine control system 300 compared to the engine control system 100.

Figure 17:
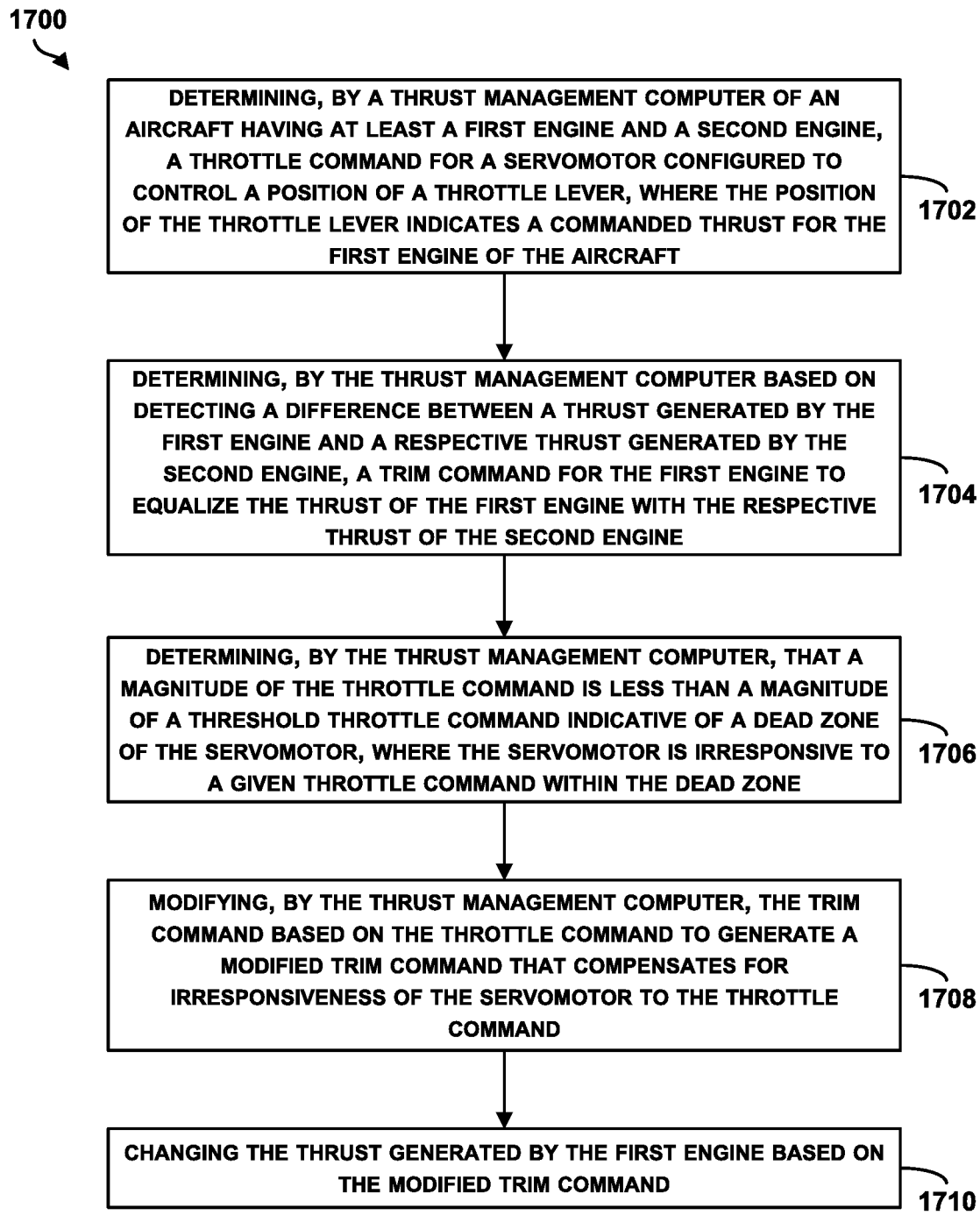
FIG. 17 is a flowchart of a method for managing engine thrust for an aircraft, in accordance with an example implementation.

FIG. 17 is a flowchart of a method 1700 for managing engine thrust for the aircraft 101, in accordance with an example implementation. The method 1700 could, for example, be performed by the thrust management computer 301. In another example, other computing devices could be used to implement the method 1700 in collaboration with the thrust management computer 301. The computing devices could be airborne and coupled to the aircraft 101 or could be ground-based. The method 1700 could, for example, be associated with performing or implementing the operations of the engine control system 300. Further, FIGS. 18-23 are flowcharts of methods for use with the method 1700.

The method 1700 may include one or more operations, or actions as illustrated by one or more of blocks 1702-1710, 1800-1804, 1900, 2000-2004, 2100, 2200-2202, and 2300. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1700 and other processes and operations disclosed herein, the flowchart shows operation of one possible implementation of present examples. In this regard, each block may represent a module, a segment, or a portion of program code, which includes one or more instructions executable by a processor (e.g., a processor or microprocessor of the thrust management computer 301) or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1700 and other processes and operations disclosed herein, one or more blocks in FIGS. 17-23 may represent circuitry or digital logic that is arranged to perform the specific logical operations in the process.

At block 1702, the method 1700 includes determining, by the thrust management computer 301 of the aircraft 101 having at least the first engine 103 and the second engine 105, a throttle command for the servomotor 110 configured to control a position of the throttle lever 104, where the position of the throttle lever 104 indicates a commanded thrust for the first engine 103 of the aircraft 101.

At block 1704, the method 1700 includes determining, by the thrust management computer 301 based on detecting a difference between a thrust generated by the first engine 103 and a respective thrust generated by the second engine 105, a trim command for the first engine 103 to equalize the thrust of the first engine 103 with the respective thrust of the second engine 105.

At block 1706, the method 1700 includes determining, by the thrust management computer 301, that a magnitude of the throttle command is less than a magnitude of a threshold throttle command indicative of a dead zone of the servomotor 110, wherein the servomotor 110 is irresponsive to a given throttle command within the dead zone.

At block 1708, the method 1700 includes modifying, by the thrust management computer 301, the trim command based on the throttle command to generate a modified trim command that compensates for irresponsiveness of the servomotor 110 to the throttle command.

At block 1710, the method 1700 includes changing the thrust generated by the first engine 103 based on the modified trim command. Particularly, the thrust management provides the modified trim command to the EEC 108 of the first engine 103 to change the thrust generated by the first engine 103 based on the modified trim command.

Figure 18:
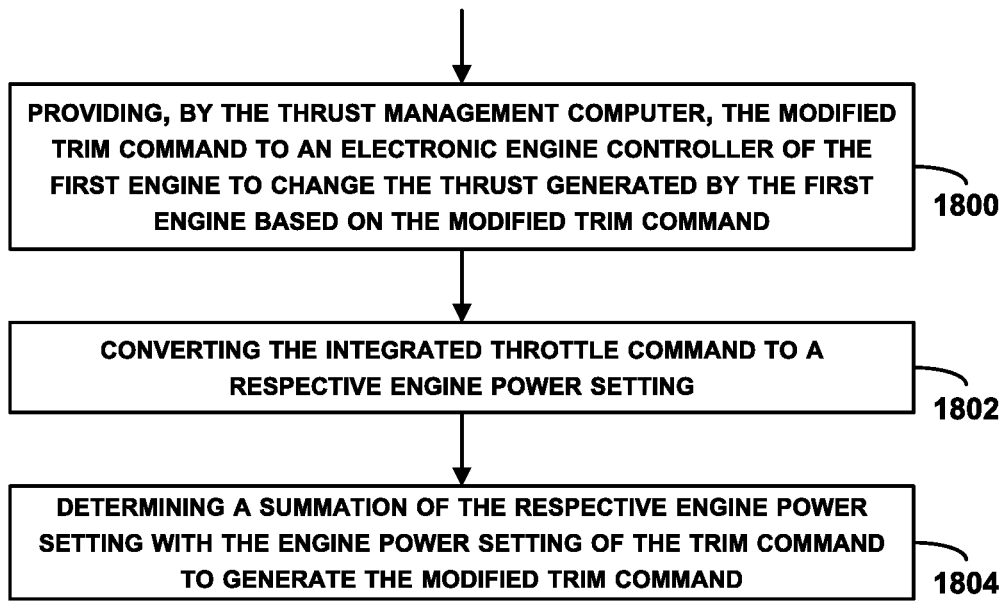
FIG. 18 is a flowchart of additional operations that may be executed and performed with the method of FIG. 17, in accordance with an example implementation.

FIG. 18 is a flowchart of additional operations that may be executed and performed with the method 1700, in accordance with an example implementation. As described above, the trim command comprises an engine power setting or an engine power setting percentage for the first engine 103. At block 1800, operations include integrating (at the block 406) the throttle command over time to generate an integrated throttle command. At block 1802, operations include converting (at the gain block 408) the integrated throttle command to a respective engine power setting. At block 1804, operations include determining (at the summation block 410) a summation of the respective engine power setting with the engine power setting of the trim command to generate the modified trim command.

Figure 19:
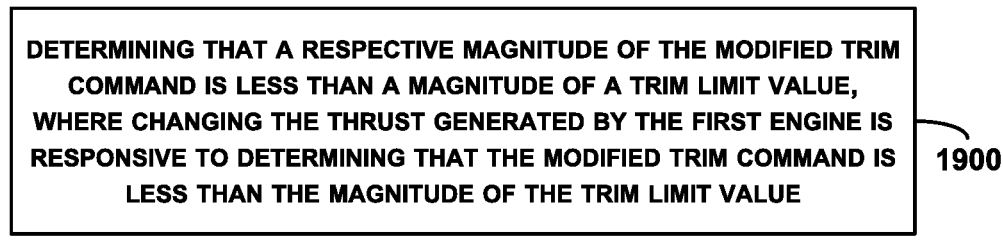
FIG. 19 is a flowchart of additional operations that may be executed and performed with the method of FIG. 17, in accordance with an example implementation.

FIG. 19 is a flowchart of additional operations that may be executed and performed with the method 1700, in accordance with an example implementation. At block 1900, operations include determining that a respective magnitude of the modified trim command is less than a magnitude of a trim limit value, where providing the modified trim command to the electronic engine controller to change the thrust generated by the first engine is responsive to determining that the modified trim command is less than the magnitude of a trim limit value.

Figure 20:
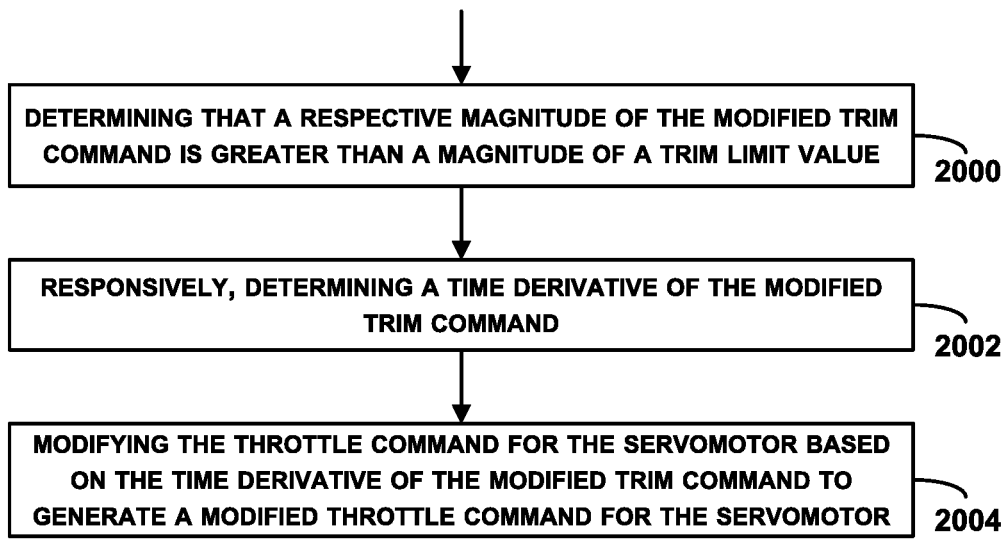
FIG. 20 is a flowchart of additional operations that may be executed and performed with the method of FIG. 17, in accordance with an example implementation.

FIG. 20 is a flowchart of additional operations that may be executed and performed with the method 1700, in accordance with an example implementation. At block 2000, operations include determining that a respective magnitude of the modified trim command is greater than a magnitude of a trim limit value. At block 2002, operations include responsively, determining (at the block 418) a time derivative of the modified trim command. At block 2004, operations include modifying the throttle command for the servomotor 110 based on the time derivative of the modified trim command to generate a modified throttle command for the servomotor 110.

Figure 21:
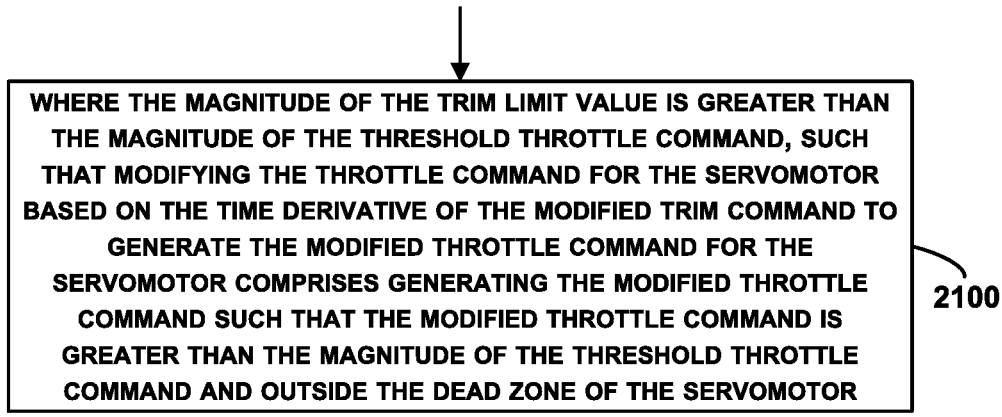
FIG. 21 is a flowchart of additional operations that may be executed and performed with the method of FIG. 17, in accordance with an example implementation.

FIG. 21 is a flowchart of additional operations that may be executed and performed with the method 1700, in accordance with an example implementation. The magnitude of the trim limit value is greater than the magnitude of the threshold throttle command, such that modifying the throttle command for the servomotor 110 based on the time derivative of the modified trim command to generate the modified throttle command for the servomotor comprises, at block 2100, operations include generating the modified throttle command such that the modified throttle command is greater than the magnitude of the threshold throttle command and outside the dead zone of the servomotor 110.

Figure 22:
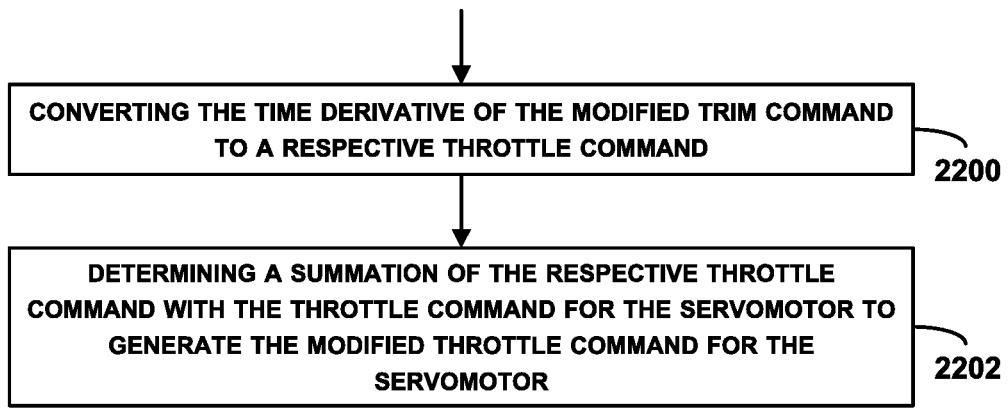
FIG. 22 is a flowchart of additional operations that may be executed and performed with the method of FIG. 17, in accordance with an example implementation.

FIG. 22 is a flowchart of additional operations that may be executed and performed with the method 1700, in accordance with an example implementation. At block 2200, operations include converting (at gain block 420) the time derivative of the modified trim command to a respective throttle command. At block 2202, operations include determining (at the summation block 422) a summation of the respective throttle command with the throttle command for the servomotor 110 to generate the modified throttle command for the servomotor 110.

Figure 23:
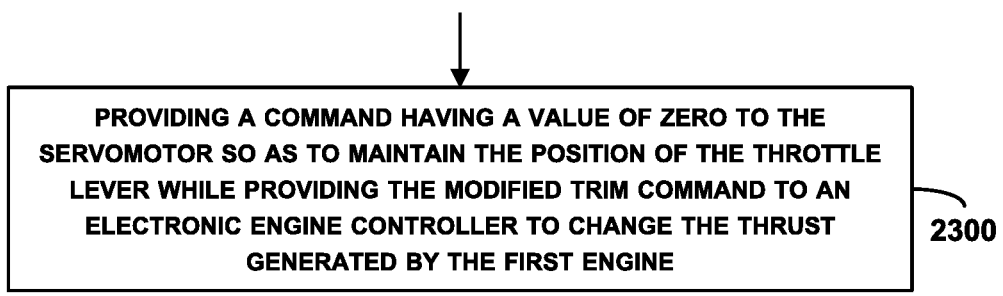
FIG. 23 is a flowchart of additional operations that may be executed and performed with the method of FIG. 17, in accordance with an example implementation.

FIG. 23 is a flowchart of additional operations that may be executed and performed with the method 1700, in accordance with an example implementation. At block 2300, operations include providing a command having a value of zero to the servomotor 110 so as to maintain the position of the throttle lever 104 while providing the modified trim command to the EEC 108 to change the thrust generated by the first engine 103.

Figure 24:
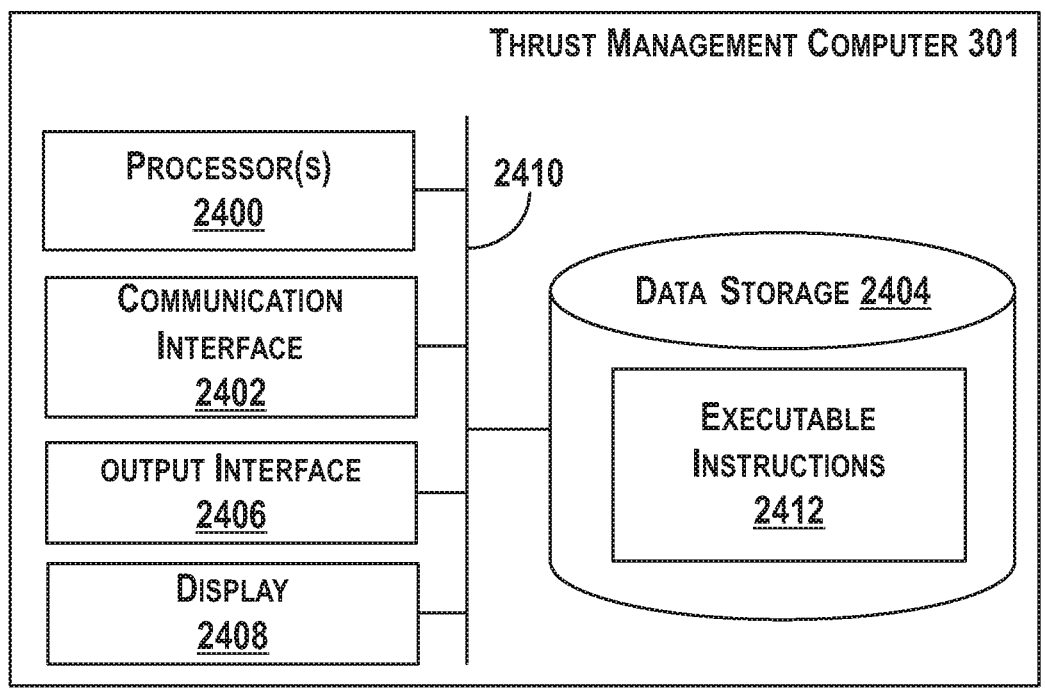
FIG. 24 is a block diagram of an example thrust management computer of an aircraft, according to an example implementation.

FIG. 24 is a block diagram of the thrust management computer 301, according to an example implementation. The thrust management computer 301 may be used, for example, to perform operations of the flowcharts shown in FIGS. 17-23 and the engine control system 300, as described herein. The thrust management computer 301 may have processor(s) 2400, and also a communication interface 2402, data storage 2404, an output interface 2406, and a display 2408 each connected to a communication bus 2410. The thrust management computer 301 may also include hardware to enable communication within the thrust management computer 301 and between the thrust management computer 301 and other devices or modules (not shown). The hardware may include transmitters, receivers, and antennas, for example The communication interface 2402 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 2402 may be configured to receive input data from one or more devices, sensors, or modules, and may also be configured to send output data to other devices or modules (e.g., guidance module, navigation module, trajectory management module, EECs 108, 109, etc. of the aircraft 101). The communication interface 2402 may also include a user-input device, such as a keyboard or mouse, for example.

The data storage 2404 may include or take the form of one or more computer-readable storage media that can be read or accessed by the processor(s) 2400. The computer-readable storage media can include volatile and/or non-volatile storage components, such as optical, magnetic, organic or other memory or disc storage, which can be integrated in whole or in part with the processor(s) 2400. The data storage 2404 is considered non-transitory computer readable media. In some examples, the data storage 2404 can be implemented using a single physical device (e.g., one optical, magnetic, organic or other memory or disc storage unit), while in other examples, the data storage 2404 can be implemented using two or more physical devices.

The data storage 2404 thus is a non-transitory computer readable storage medium, and executable instructions 2412 are stored thereon. The executable instructions 2412 include computer executable code. When the executable instructions 2412 are executed by the processor(s) 2400, the processor(s) 2400 are caused to perform operations of the thrust management computer 301 associated with the flowcharts shown in FIGS. 17-23 and the engine control system 300.

The processor(s) 2400 may be a general-purpose processor or a special purpose processor (e.g., digital signal processors, application specific integrated circuits, etc.). The processor(s) 2400 may receive inputs from the communication interface 2402, and process the inputs to generate outputs that are stored in the data storage 2404 and output to the display 2408 (e.g., a cockpit display). The processor(s) 2400 can be configured to execute the executable instructions 2412 (e.g., computer-readable program instructions) that are stored in the data storage 2404 and are executable to provide the functionality of the thrust management computer 301 described herein.

The output interface 2406 outputs information to the display 2408 or to other components as well. Thus, the output interface 2406 may be similar to the communication interface 2402 and can be a wireless interface (e.g., transmitter) or a wired interface as well.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method comprising:
   determining, by a thrust management computer of an aircraft having at least a first engine and a second engine, a throttle command for a servomotor configured to control a position of a throttle lever, wherein the position of the throttle lever indicates a commanded thrust for the first engine of the aircraft;
   determining, by the thrust management computer based on detecting a difference between a thrust generated by the first engine and a respective thrust generated by the second engine, a trim command for the first engine to equalize the thrust of the first engine with the respective thrust of the second engine;
   determining, by the thrust management computer, that a magnitude of the throttle command is less than a magnitude of a threshold throttle command indicative of a dead zone of the servomotor, wherein the servomotor is irresponsive to a given throttle command within the dead zone;
   modifying, by the thrust management computer, the trim command based on the throttle command to generate a modified trim command that compensates for irresponsiveness of the servomotor to the throttle command; and
   providing, by the thrust management computer, the modified trim command to an electronic engine controller of the first engine, thereby changing the thrust generated by the first engine.

2. The method of claim 1, wherein the trim command comprises an engine power setting for the first engine, and wherein modifying the trim command comprises:
   integrating the throttle command over time to generate an integrated throttle command;
   converting the integrated throttle command to a respective engine power setting; and
   determining a summation of the respective engine power setting with the engine power setting of the trim command to generate the modified trim command.

3. The method of claim 1, further comprising:
   determining that a respective magnitude of the modified trim command is less than a magnitude of a trim limit value, wherein changing the thrust generated by the first engine is responsive to determining that the modified trim command is less than the magnitude of the trim limit value.

4. The method of claim 1, further comprising:
   determining that a respective magnitude of the modified trim command is greater than a magnitude of a trim limit value;
   responsively, determining a time derivative of the modified trim command; and
   modifying the throttle command based on the time derivative of the modified trim command to generate a modified throttle command for the servomotor.

5. The method of claim 4, wherein the magnitude of the trim limit value is greater than the magnitude of the threshold throttle command, such that modifying the throttle command based on the time derivative of the modified trim command to generate the modified throttle command for the servomotor comprises generating the modified throttle command such that the modified throttle command is greater than the threshold throttle command and outside the dead zone of the servomotor.

6. The method of claim 4, further comprising:
   converting the time derivative of the modified trim command to a respective throttle command; and
   determining a summation of the respective throttle command with the throttle command to generate the modified throttle command for the servomotor.

7. The method of claim 1, further comprising:
   providing a command having a value of zero to the servomotor so as to maintain the position of the throttle lever while providing the modified trim command to the electronic engine controller to change the thrust generated by the first engine.

8. A non-transitory computer readable medium having stored therein instructions that, in response to execution by a thrust management computer of an aircraft having at least a first engine and a second engine, cause the thrust management computer to perform operations comprising:

determining a throttle command for a servomotor configured to control a position of a throttle lever, wherein the position of the throttle lever indicates a commanded thrust for the first engine of the aircraft;

determining, based on detecting a difference between a thrust generated by the first engine and a respective thrust generated by the second engine, a trim command for the first engine to equalize the thrust of the first engine with the respective thrust of the second engine;

determining that a magnitude of the throttle command is less than a magnitude of a threshold throttle command indicative of a dead zone of the servomotor, wherein the servomotor is irresponsive to a given throttle command within the dead zone;

modifying the trim command based on the throttle command to generate a modified trim command that compensates for irresponsiveness of the servomotor to the throttle command; and providing the modified trim command to an electronic engine controller of the first engine, thereby changing the thrust generated by the first engine.

9. The non-transitory computer readable medium of claim 8, wherein the trim command comprises an engine power setting for the first engine, and wherein modifying the trim command comprises:

integrating the throttle command over time to generate an integrated throttle command;

converting the integrated throttle command to a respective engine power setting; and determining a summation of the respective engine power setting with the engine power setting of the trim command to generate the modified trim command.

10. The non-transitory computer readable medium of claim 8, wherein the operations further comprise:

determining that a respective magnitude of the modified trim command is less than a magnitude of a trim limit value, wherein changing the thrust generated by the first engine is responsive to determining that the modified trim command is less than the magnitude of the trim limit value.

11. The non-transitory computer readable medium of claim 8, wherein the operations further comprise:

determining that a respective magnitude of the modified trim command is greater than a magnitude of a trim limit value;

responsively, determining a time derivative of the modified trim command; and modifying the throttle command for the servomotor based on the time derivative of the modified trim command to generate a modified throttle command for the servomotor.

12. The non-transitory computer readable medium of claim 11, wherein the magnitude of the trim limit value is greater than the magnitude of the threshold throttle command, such that modifying the throttle command for the servomotor based on the time derivative of the modified trim command to generate the modified throttle command for the servomotor comprises generating the modified throttle command such that the modified throttle command is greater than the threshold throttle command and outside the dead zone of the servomotor.

13. The non-transitory computer readable medium of claim 11, wherein the operations further comprise:

converting the time derivative of the modified trim command to a respective throttle command; and determining a summation of the respective throttle command with the throttle command for the servomotor to generate the modified throttle command for the servomotor.

14. The non-transitory computer readable medium of claim 8, wherein the operations further comprise:

providing a command having a value of zero to the servomotor so as to maintain the position of the throttle lever while providing the modified trim command to the electronic engine controller to change the thrust generated by the first engine.

15. A thrust management computer of an aircraft having at least a first engine and a second engine, the thrust management computer comprising:

one or more processors; and data storage storing thereon instructions, that when executed by the one or more processors, cause the thrust management computer to perform operations comprising:

determining a throttle command for a servomotor configured to control a position of a throttle lever, wherein the position of the throttle lever indicates a commanded thrust for the first engine of the aircraft;

determining, based on detecting a difference between a thrust generated by the first engine and a respective thrust generated by the second engine, a trim command for the first engine to equalize the thrust of the first engine with the respective thrust of the second engine;

determining that a magnitude of the throttle command is less than a magnitude of a threshold throttle command indicative of a dead zone of the servomotor, wherein the servomotor is irresponsive to a given throttle command within the dead zone;

modifying the trim command based on the throttle command to generate a modified trim command that compensates for irresponsiveness of the servomotor to the throttle command; and providing the modified trim command to an electronic engine controller of the first engine, thereby changing the thrust generated by the first engine.

16. The thrust management computer of claim 15, wherein the trim command comprises an engine power setting for the first engine, and wherein modifying the trim command comprises:

integrating the throttle command over time to generate an integrated throttle command;

converting the integrated throttle command to a respective engine power setting; and determining a summation of the respective engine power setting with the engine power setting of the trim command to generate the modified trim command.

17. The thrust management computer of claim 15, wherein the operations further comprise:

determining that a respective magnitude of the modified trim command is less than a magnitude of a trim limit value, wherein changing the thrust generated by the first engine is responsive to determining that the modified trim command is less than the magnitude of the trim limit value.

18. The thrust management computer of claim 15, wherein the operations further comprise:

determining that a respective magnitude of the modified trim command is greater than a magnitude of a trim limit value;

responsively, determining a time derivative of the modified trim command; and modifying the throttle command for the servomotor based on the time derivative of the modified trim command to generate a modified throttle command for the servomotor.

19. The thrust management computer of claim 18, wherein the magnitude of the trim limit value is greater than the magnitude of the threshold throttle command, such that modifying the throttle command for the servomotor based on the time derivative of the modified trim command to generate the modified throttle command for the servomotor comprises generating the modified throttle command such that the modified throttle command is greater than the threshold throttle command and outside the dead zone of the servomotor.

20. The thrust management computer of claim 18, wherein the operations further comprise:
  converting the time derivative of the modified trim command to a respective throttle command; and
  determining a summation of the respective throttle command with the throttle command for the servomotor to generate the modified throttle command for the servomotor.

* * * * *